United States Patent
Kwon et al.

(10) Patent No.: US 9,772,747 B2
(45) Date of Patent: Sep. 26, 2017

(54) ELECTRONIC DEVICE HAVING TOUCHSCREEN AND INPUT PROCESSING METHOD THEREOF

(71) Applicant: Samsung Electronics Co., Ltd., Gyeonggi-do (KR)

(72) Inventors: Hyukjoon Kwon, Gyeonggi-do (KR); Yong Shin, Gyeonggi-do (KR); Hyeyoung Sheen, Gyeonggi-do (KR); Woojun Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 309 days.

(21) Appl. No.: 14/540,447

(22) Filed: Nov. 13, 2014

(65) Prior Publication Data

US 2015/0135129 A1    May 14, 2015

(30) Foreign Application Priority Data

Nov. 13, 2013    (KR) .................. 10-2013-0137449

(51) Int. Cl.
  *G06F 3/0482*    (2013.01)
  *G06F 3/0488*    (2013.01)

(52) U.S. Cl.
  CPC .......... *G06F 3/0482* (2013.01); *G06F 3/0488* (2013.01); *G06F 3/04883* (2013.01); *G06F 3/04886* (2013.01); *G06F 2203/04807* (2013.01); *G06F 2203/04808* (2013.01)

(58) Field of Classification Search
  CPC .................................... G06F 3/0482
  USPC ........................................ 715/781
  See application file for complete search history.

(56) References Cited

U.S. PATENT DOCUMENTS

| 6,078,767 | A  | * | 6/2000 | Hino | ............... | H04N 1/626 |
| | | | | | | 399/182 |
| 6,421,042 | B1 | * | 7/2002 | Omura | ............. | G06F 3/011 |
| | | | | | | 345/156 |
| 6,809,742 | B1 | * | 10/2004 | Motosugi | ......... | H04N 1/3873 |
| | | | | | | 345/619 |

(Continued)

FOREIGN PATENT DOCUMENTS

| JP | 2011-0198382 | 10/2011 |
| KR | 2012-0029447 | 3/2012 |

OTHER PUBLICATIONS

Snagit 9 overview tutorial by Techsmith, online available at [https://www.youtube.com/watch?v=ayqsCYVBRgY], Mar. 10, 2009, 21 pages.*

(Continued)

*Primary Examiner* — Reza Nabi
(74) *Attorney, Agent, or Firm* — The Farrell Law Firm, P.C.

(57) ABSTRACT

A method and an apparatus are provided for performing a function corresponding to a recognized user input through a touch screen. The method includes displaying a window of an application; displaying a setting menu of the application; receiving a selection for at least one item in the setting menu; recognizing an input object that performed the selection; registering the input object as an object for executing a function corresponding to the at least one item selected by the input object; detecting an input by the input object in the application window; and executing the function in response to the input by the input object.

10 Claims, 31 Drawing Sheets

(56) References Cited

U.S. PATENT DOCUMENTS

| | | | | |
|---|---|---|---|---|
| 2002/0044672 | A1* | 4/2002 | Inukai | B44D 3/003 |
| | | | | 382/100 |
| 2006/0288312 | A1* | 12/2006 | Akiyama | G06F 3/0481 |
| | | | | 715/856 |
| 2010/0095205 | A1 | 4/2010 | Kinoshita | |
| 2012/0327008 | A1* | 12/2012 | Kurita | G06F 3/041 |
| | | | | 345/173 |
| 2013/0120281 | A1* | 5/2013 | Harris | G06F 3/04883 |
| | | | | 345/173 |
| 2013/0156275 | A1* | 6/2013 | Amacker | G06K 9/00677 |
| | | | | 382/118 |
| 2013/0229389 | A1* | 9/2013 | DiVerdi | G06F 3/0488 |
| | | | | 345/179 |
| 2014/0204247 | A1* | 7/2014 | Bilgen | G06F 3/04883 |
| | | | | 348/240.2 |
| 2014/0225863 | A1* | 8/2014 | Tanaka | G06F 3/0416 |
| | | | | 345/174 |
| 2016/0301791 | A1* | 10/2016 | Kim | H04M 1/7253 |

OTHER PUBLICATIONS

Picsay Pro product manufactured by Shinycore online available at [https://www.amazon.com/Shinycore-PicSay-Pro/dp/B004OZK9VW], Released on Jun. 1, 2009, 5 pages.*

* cited by examiner

| FUNCTION INFORMATION OF MEMO APPLICATION | INPUT OBJECT AND INPUT PATTERN |
|---|---|
| Line drawing | Pen touch |
| Erase | Finger touch |
| Screen scroll | Finger drag + push pen button |
| Brush (calligraphy) | Finger touch + pen movement |
| Move to next memo | Finger pattern 1[  ] |
| Move to previous memo | Finger pattern 2[  ] |
| Memo attachment | Finger pattern 3[  ] |
| Memo deletion | Finger pattern 4[  ] |

ELECTRONIC DEVICE HAVING TOUCHSCREEN AND INPUT PROCESSING METHOD THEREOF

PRIORITY

This application claims priority under 35 U.S.C. §119(a) to Korean Patent Application Serial No. 10-2013-0137449, which was filed in the Korean Intellectual Property Office on Nov. 13, 2013, the entire disclosure of which is hereby incorporated by reference.

BACKGROUND OF THE INVENTION

1. Field of the Invention

The present invention relates generally to a method and an apparatus for performing a corresponding function by recognizing user input through a touch screen.

2. Description of the Related Art

Often, an electronic device such as a smart phone, a tablet personal computer (PC), etc., includes a touch panel installed in a screen of the electronic device. Accordingly, the electronic device may recognize user input through the screen (i.e., a touch screen), and may perform a function corresponding to the recognized input.

The electronic device may recognize a tool (e.g., a user's finger or a pen, etc.) used for an input of the electronic device. For example, the electronic device may perform a function corresponding to a pen input, and the may perform a function corresponding to a finger input. However, when a pen input and a finger input are simultaneously generated, one of the two inputs (e.g., finger input) may not be recognized as an input.

SUMMARY OF THE INVENTION

The present invention has been made to address at least the above problems and/or disadvantages and to provide at least the advantages described below.

Accordingly, an aspect of the present invention is to provide a method and an apparatus capable of performing a different function for each input tool so that user can conveniently operate an electronic device.

Another aspect of the present invention is to provide a method and an apparatus capable of recognizing multiple inputs of different input tools through a touch screen and performing a corresponding function so that user can conveniently operate an electronic device.

In accordance with an aspect of the present invention, a method is provided for processing a user input for a touch screen in an electronic device. The method includes displaying a window of an application; displaying a setting menu of the application; receiving a selection for at least one item in the setting menu; recognizing an input object that performed the selection; registering the input object as an object for executing a function corresponding to the at least one item selected by the input object; detecting an input by the input object in the application window; and executing the function in response to the input by the input object.

In accordance with another aspect of the present invention, a method is provided for processing a user input for a touch screen in an electronic device. The method includes displaying a setting menu of an application; setting at least one input object and a respective input pattern for a function of the application, in response to a selection of the setting menu; storing information for the settings; displaying a window of the application; recognizing a user input for the window, an input object used for the user input, and an input pattern of the user input; identifying a function registered for the recognized user input, the input object, and the input pattern of the user input with reference to the stored information; and executing the identified function.

In accordance with another aspect of the present invention, a method is provided for processing a user input for a touch screen in an electronic device. The method includes displaying an image from a camera; setting a capture area in response to an input of a first input object for the displayed image; and storing an image corresponding to the capture area in response to an input of a second input object for the displayed image.

In accordance with another aspect of the present invention, an electronic device is provided, which includes a display unit; a touch panel to detect an input for a screen displayed by the display unit; and a controller to control the display unit to display a window of an application and a setting menu of the application, receive a selection for at least one item in the setting menu from the touch panel, recognize an input object that performed the selection, register the input object as an object for executing a function corresponding to the at least one item selected by the input object, receive the input by the input object in the application window from the touch panel, and execute the function in response to the input by the input object.

In accordance with another aspect of the present invention, an electronic device is provided, which includes a display unit; a touch panel to detect an input for a screen displayed by the display unit; a memory; and a controller to control the display unit to display a setting menu of an application, set at least one input object and a respective input pattern for a function of the application, in response to a selection of the setting menu, store information for the settings in the memory, control the display unit to display a window of the application, recognize an input for the window, an input object used for such input, and an input pattern of the user input, identify a function registered for the recognized input, the input object, and the input pattern of the user input with reference to the information stored in the memory, and execute the identified function.

In accordance with another aspect of the present invention, an electronic device is provided, which includes a display unit; a touch panel to generate detection information in response to an input for a screen displayed by the display unit; a camera; a memory; and a controller to display an image of the camera, set a capture area in response to an input of a first input object for the displayed image, and store an image corresponding to the capture area in the memory in response to an input of a second input object for the displayed image.

BRIEF DESCRIPTION OF THE DRAWINGS

The above and other aspects, features, and advantages of certain embodiments of the present invention will be more apparent from the following detailed description in conjunction with the accompanying drawings, in which.

DETAILED DESCRIPTION OF EMBODIMENTS OF THE INVENTION

Various embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Examples of an electronic device as described herein may include a computing device having a touch screen, such as a smart phone, a camera, a tablet PC, a notebook PC, a desktop PC, a media player (e.g., MP3 player), PDA, a gaming terminal, a wearable computer (e.g., a watch), etc. In addition, the electronic device may include a home appliance (e.g., a refrigerator, a TV, a washing machine, etc.) in which includes a computing device.

Figure 1:
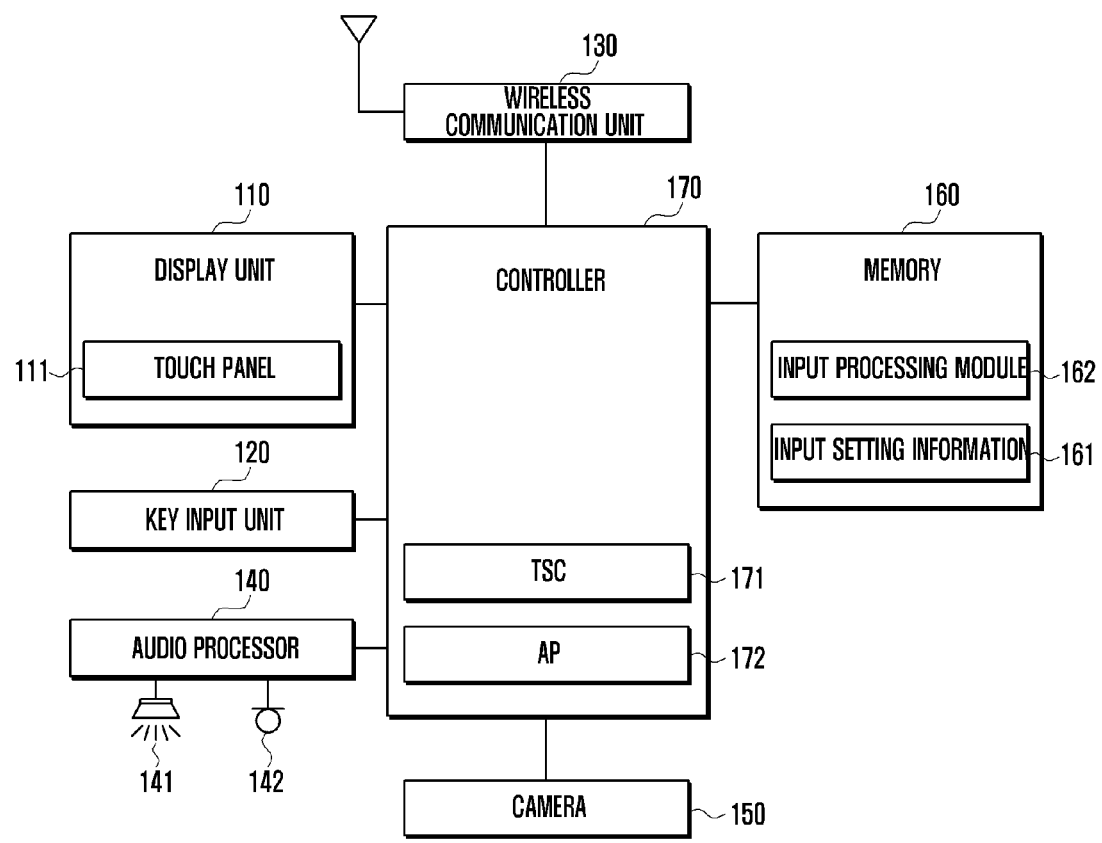
FIG. 1 is a block diagram illustrating an electronic device according to an embodiment of the present invention.

FIG. 1 is a block diagram illustrating an electronic device according to an embodiment of the present invention.

Referring to FIG. 1, the electronic device includes a display unit 110, a key input unit 120, a wireless communication unit 130, an audio processor 140, a speaker 141, a microphone 142, a camera 150, a memory 160, and a controller 170.

The display unit 110 displays various information on a screen under the control of the controller 170, particularly, an application processor (AP).

For example, the display unit 110 may display an application window on the entire screen or a part of the screen under the control of the controller 170. The application window is an image, which is displayed on the screen according to execution of corresponding application, such as a photograph, a web page, a memo window, a page of e-book, and a preview image of the camera 150, etc.

The display unit 110 may also display a setting menu of application on the screen under the control of the controller 170. For example, the setting menu may include various items for setting a use environment of corresponding application such as an item for mapping an input object and its input pattern to a function.

The display unit 110, under the control of the controller 170, may display the setting menu of application, e.g., a quick menu, on a corresponding application window. For example, the quick menu may include an item that enables user to set some of functions of corresponding application, such as an item for mapping an input object and its input pattern to function.

The setting menu may be displayed semi-transparently over a part of corresponding window or on a separate display area (i.e., the setting menu and window do not overlap).

The display unit 110 may be formed of a Liquid Crystal Display (LCD), an Active Matrix Organic Light Emitted Diode (AMOLED), a Flexible display, or a transparent flexible display.

A touch panel 111 is provided on the screen of the display unit 110. The touch panel 111 detects a user input. The touch panel 111 generates detection information in response to the user input, and sends the generated detection information to the controller 170. That is, the display unit 110 includes the touch panel 111 as a user input unit. For example, the touch panel 111 may be implemented in an add-on type which is located on the screen of the display unit 110, or in an on-cell type or an in-cell type which is inserted in the display unit 110.

The touch panel 111 may include a first touch panel of capacitive type, which includes a plurality of scan input ports (hereinafter, scan port) and a plurality of detection output ports (hereinafter, detection port). The touch panel may generate detection information (e.g., variation in an amount of capacitance) in response to a touch of a conductive object (e.g., a finger) by a scan control signal from a touch screen controller of the controller 170, which is input to the scan port, and may send the detection information to the touch screen controller through a detection port.

The touch panel 111 may also include a second touch panel of electro-magnetic resonance (EMR), which generates detection information in response to an indirect touch (i.e., hovering) or touch of a pen specifically designed to generate a magnetic field, and sends the generated detection information to the touch screen controller of the controller 170. In this case, the pen may be provided with a button. For example, when user presses down the button, the magnetic field generated in the coil of the pen may be changed. The second touch panel may generate the detection information in response to a variation of the magnetic field, and may send the generated detection information to the touch screen controller of controller 170.

The pen may be provided with two coils, which operate as antennas. That is, the two coils may receive a wireless signal from the second touch panel, and may transmit a wireless signal of different frequency band to the second touch panel in response to the reception of the wireless signal.

One of the two coils may be located in a pen point, and the other may be located in the opposite side. These two coils may be applied to different functions. For example, user may write a letter by contacting the pen point to the touch screen, and may erase the letter by contacting the opposite side to the touch screen.

The touch panel 111 may include a touch panel of a resistive type, an infrared type, or an ultrasonic type, in addition to the above described types.

The key input unit 120 may include a touch key, e.g., a capacitive type, an electro-magnetic resonance type, a resistive type, an infrared type, or an ultrasonic type. The touch key may generate a key event in response to a touch of input object, and may send the generated key event to the controller 170.

The key input unit 120 may further include other keys besides the touch key. For example, the key input unit 120 may include a dome key. When user presses down the dome key, the dome key is deformed to contact a printed circuit board. Thus, a key event is generated from the printed circuit board and is sent to the controller 170.

A key of the input unit 120 may be called as a hard key and a key displayed on the display unit 110 may be called as a soft key.

The wireless communication unit 130 may perform a voice call, a video call, or data communication with an external device through a network under the control of the controller 170. For example, the wireless communication unit 130 may receive a call request message, a text message, etc.

For example, the wireless communication unit 130 may include a mobile communication module (e.g., a 3rd-Generation mobile communication module, a 3.5-Generation mobile communication module, or a 4th-Generation mobile communication module, etc.), a digital broadcasting module (e.g., DMB module), and a short-range communication module (e.g., a Wi-Fi module, a Bluetooth module, and a Near Field Communication (NFC) module).

The audio processor 140 may be combined with a speaker 141 and a microphone 142 to perform an input and output of audio signals (e.g., voice data) for voice recognition, voice recording, voice modulation, digital recording, and a call. The audio processor 140 may receive the audio signal (e.g., voice data) from the controller 170, and digital to analog (D/A) convert the received audio signal into an analog signal and amplify the converted signal to output to the speaker 141.

The audio processor 140 may be combined with a receiver and an earphone, and may output the amplified signal to the receiver or the earphone, not to the speaker 141. Here, the earphone may be connected to and separated from the electronic device through ear jack.

If the earphone is connected to the audio processor 140, the audio processor 140 may output an audio signal to the earphone. If a call mode is a speaker mode, the audio processor 140 may output the audio signal to the speaker 141. If the call mode is a receiver mode, the audio processor 140 may output the audio signal to the receiver. The speaker 141, the receiver, and the earphone may convert the audio signal received from the audio processor 140 into a sound wave and output the converted audio signal.

The microphone 142 may convert the sound wave sent from a person or other sound source into an audio signal.

The earphone may be a four-pole earphone, i.e., an earphone provided with a microphone.

The audio processor 140 may analog to digital (A/D) convert the audio signal received from the microphone 142 or a microphone of the earphone into a digital signal and send to the controller 170.

The camera 150 photographs a subject under the control of the controller 170. The image information of the photographed subject may be stored in the memory 160, and may be displayed on the display unit 110 under the control of the controller 170. The camera 150 may include a lens for collecting a light, an image sensor for converting the collected light to an electrical signal, and an image signal processor (ISP) which processes the electrical signal inputted from the image sensor as a raw data to output to the controller 170.

The ISP may include a module that processes the raw data as a preview image to output to the controller 170, and a module that processes the raw data as a compression image to output to the controller 170. Here, the preview image is an image displayed on the screen, which is resized to be adjusted to a size of the screen. That is, the preview image may be an image that is reduced to a low resolution data from a high resolution raw data.

The compression image is an image for storage, and may indicate a data which is obtained by compressing raw data with a certain format such as JPEG, or the like.

The memory 160 may store, under the control of the controller 170, the data generated according to the operation of the electronic device, or received from an external device through the wireless communication unit 130. The memory 160 may also include a buffer as a temporary data storage. The memory 160 may store various setting information (e.g., a brightness of screen, a vibration at the time of touch occurrence, and an automatic rotation of screen, etc.) for setting a use environment of the electronic device.

The controller 170 may operate the electronic device with reference to such setting information.

In particular, the memory 160 may include input setting information 161 that indicates how to process the user input for the touch screen. For example, the input setting information 161 may include an input object and function information that is executed according to an input pattern of the input object, and may be provided for each application.

Figure 20:
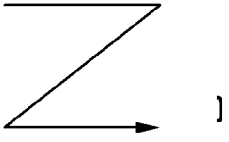
FIG. 20 illustrates a table including an example of input setting information for a memo application according to an embodiment of the present invention.
Figure 20:
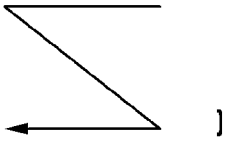
Figure 20:
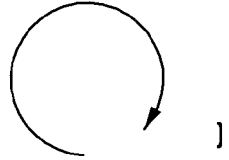
Figure 20:

FIG. 20 illustrates a table including an example of input setting information for a memo application according to an embodiment of the present invention.

Table 1 is an example of input setting information for a camera application.

TABLE 1

| Function information of memo application | Input object and input pattern |
|---|---|
| Capture area setting in preview image | Pen touch |
| Store capture area | Finger touch |

Table 2 is an example of input setting information for an application icon.

TABLE 2

| Application icon | Input object and input pattern |
| --- | --- |
| Execution of corresponding application | Finger touch |
| Display setting menu (e.g., including an execution button, a delete button, and an automatic update setting button, etc.) of corresponding application | Pen touch |

Table 3 is an example of input setting information for a web browser.

TABLE 3

| Function information of web browser | Input object and input pattern |
| --- | --- |
| Link selection | Pen touch |
| Screen scroll | Finger drag |

Referring again to FIG. 1, the memory 160 may store various programs for the operation of the electronic device, e.g., a boot program, one or more operating systems, and various applications such as a memo application, a web browser, an e-book application, a camera application, a calendar application, a gallery application, a contacts application, and a call application. In addition, the memory 160 stores an input processing module 162.

The input processing module 162 is a program configured to enable the controller 170 to perform a process that handles a user input for touch screen. Such input processing module 162 may be a partial configuration of operating system or a separate application. In addition, the input processing module 162 may be a partial configuration of application (e.g., a memo application, a camera application, e-book application, a web browser, and the like).

In addition, the input processing module 162 may be a firmware which is embedded in the controller 170, in particular, in an internal memory (e.g., ROM, flash memory, or EPROM) of application processor and enables the application processor to perform a corresponding operation.

The input processing module 162 may be set to perform an operation to display an application window and its setting menu (in particular, a quick menu), an operation to receive a selection of one of items of setting menu, an operation to recognize an input object that performed the selection, an operation to register the recognized input object as an object for executing a function corresponding to the selected item, an operation to receive the input by the input object in an application window, and an operation to execute a function registered for the input object in response to the input by the input object.

In addition, the input processing module 162 may be set to perform an operation to display a setting menu of application, an operation to set at least input object and its input pattern to each function of the application, and an operation to store input setting information in the memory 160.

Further, the input processing module 162 may be set to perform an operation to display an application window, an operation to recognize an input of input object, an operation to determine the recognized input and a function registered for the object with reference to previously stored input setting information, and an operation to execute a registered function.

In addition, the input processing module 162 may be set to perform an operation to display a preview image on a screen by operating a camera, an operation to recognize an input of a first input object in the preview image, an operation to set a capture area in the preview image in response to the input of the first input object, an operation to recognize an input of a second input object for the capture area, and an operation to store the capture area in the memory 160 in response to the input of the second input object.

In addition, the input processing module 162 may be set to perform an operation to recognize one selection of icons displayed on a screen and an input object used for the selection, an operation to determine a function registered for the recognized input object with reference to previously stored input setting information, an operation to execute a corresponding application when the recognized input object is a first input object, and an operation to execute (e.g., display setting menu of corresponding application) other function when the recognized input object is a second input object.

The memory 160 may also include a main memory and a secondary memory. The main memory may be implemented by, for example, a random access memory (RAM). The secondary memory may be implemented by a disk, RAM, ROM, or a flash memory, or the like. The main memory may load various programs, such as a boot program, an operating system, and applications, e.g., loaded from the secondary memory.

When battery power is supplied to the controller 170, the boot program may be loaded to the main memory. The boot program may load the operating system into the main memory, and the operating system may load application into the main memory. The controller 170 (e.g., application processor (AP)) may access the main memory to decode a program instruction (routine), and execute a function according to decoding result. That is, various programs may be loaded to the main memory to operate as a process.

The controller 170 may control an overall operation of the electronic device and a signal flow between internal configurations of the electronic device, perform a function to process data, and control power supply from the battery to the above described configurations. The controller 170 includes a touch screen controller (TSC) 171 and an application processor (AP) 162.

The TSC 171 may receive detection information from the touch screen panel 111, and recognize the occurrence of user input (e.g., a touch, a hovering, and a pressing of pen button, etc.) by analyzing the received detection information. The TSC 171 may determine a hovering area in the touch screen in response to hovering, and calculate a hovering coordinate (x_hovering, y_hovering) in the hovering area.

The TSC 171 may send a hovering event including the calculated hovering coordinate to the AP 172. In addition, the hovering event may include a depth value. For example, the hovering event may include a three-dimensional hovering coordinate (x, y, z). Here, the value of z may mean a depth. The TSC 171 may determine a touch area in the touch screen in response to a touch, and may calculate a touch coordinate (x_touch, y_touch) in the touch area.

The TSC 171 may send a touch event including the calculated touch coordinate to the AP 172 or may send a pen button event to the AP 172 in response to a pressing of pen button.

The AP 172 may receive a touch screen event (e.g., a hovering event, a touch event, a pen button event, etc) from the TSC 171, and perform a function corresponding to the touch screen event.

The AP 172 may determine that the input object hovers on the touch screen when the hovering coordinate is received from the TSC 171, and may determine that the hovering of the input object is released from the touch screen when the hovering coordinate is not received from the touch panel 111.

In addition, the AP 172 may determine that a hovering motion of the input object is generated, when the hovering coordinate is changed and a change amount exceeds a preset movement threshold. The AP 172 may calculate a change amount of position (dx, dy) of input object, a moving speed of input object, and a trajectory of the hovering motion in response to the hovering motion of the input object.

In addition, the AP 172 may determine a user input for the touch screen, based on the hovering coordinate, the hovering release of input object, the movement of input object, the change amount of position of input object, the moving speed of input object, and the trajectory of hovering motion, etc. For example, the user input may include a drag, a flick, a pinch in, a pinch out, a scroll, etc.

The AP 172 may determine that the input object is touched to the touch panel 111 when the touch coordinate is received from the TSC 171, and may determine that the touch of the input object is released from the touch screen when the touch coordinate is not received from the touch panel 111.

In addition, the AP 172 may determine that touch motion of the input object is generated, when the touch coordinate is changed and the change amount exceeds a preset movement threshold. The AP 172 may calculate a change amount of position (dx, dy) of input object, a moving speed of input object, and a trajectory of the touch motion in response to the touch motion of the input object.

In addition, the AP 172 may determine a user input for the touch screen, based on the touch coordinate, the touch release of input object, the movement of input object, the change amount of position of input object, the moving speed of input object, and the trajectory of touch motion, etc. For example, the user input may include a touch, a multi touch, a tap, a double tap, a long tap, a drag, a flick, a press, a pinch in, a pinch out, a scroll, etc.

The AP 172 may receive a key event from the key input unit 120 and perform a function corresponding to the key event.

The AP 172 may execute various programs stored in the memory 160. That is, the AP 172 may load various programs from the secondary memory to the main memory to operate as a process. In particular, the AP 172 may execute the input processing module 162 as a process. Further, the AP 172 may simultaneously process (i.e., a multi-processing) programs.

The controller 170 may further include various processors in addition to the AP 172. For example, the controller 170 may include a graphic processing unit (GPU) that handles a graphic processing. In addition, the controller 170 may also include a communication processor (CP) that handles a mobile communication when the electronic device is equipped with a mobile communication module (e.g., a 3-Generation mobile communication module, a 3.5-Generation mobile communication module, or a 4-Generation mobile communication module, etc.).

The above-described processors may be, respectively, integrated into a single package in which two or more independent cores (e.g., a quad-core) are implemented in a single integrated circuit. For example, the AP 172 may be integrated into a single multi-core processor. The above-described processors may also be integrated into a single chip such as a System on Chip (SoC). In addition, the above-described processors may be packaged in a multi layer.

The electronic device may also include components that are not mentioned above, such as a GPS reception module, a vibration motor, an infrared sensor, an acceleration sensor, a gyro sensor, a proximity sensor, etc.

Figure 2:
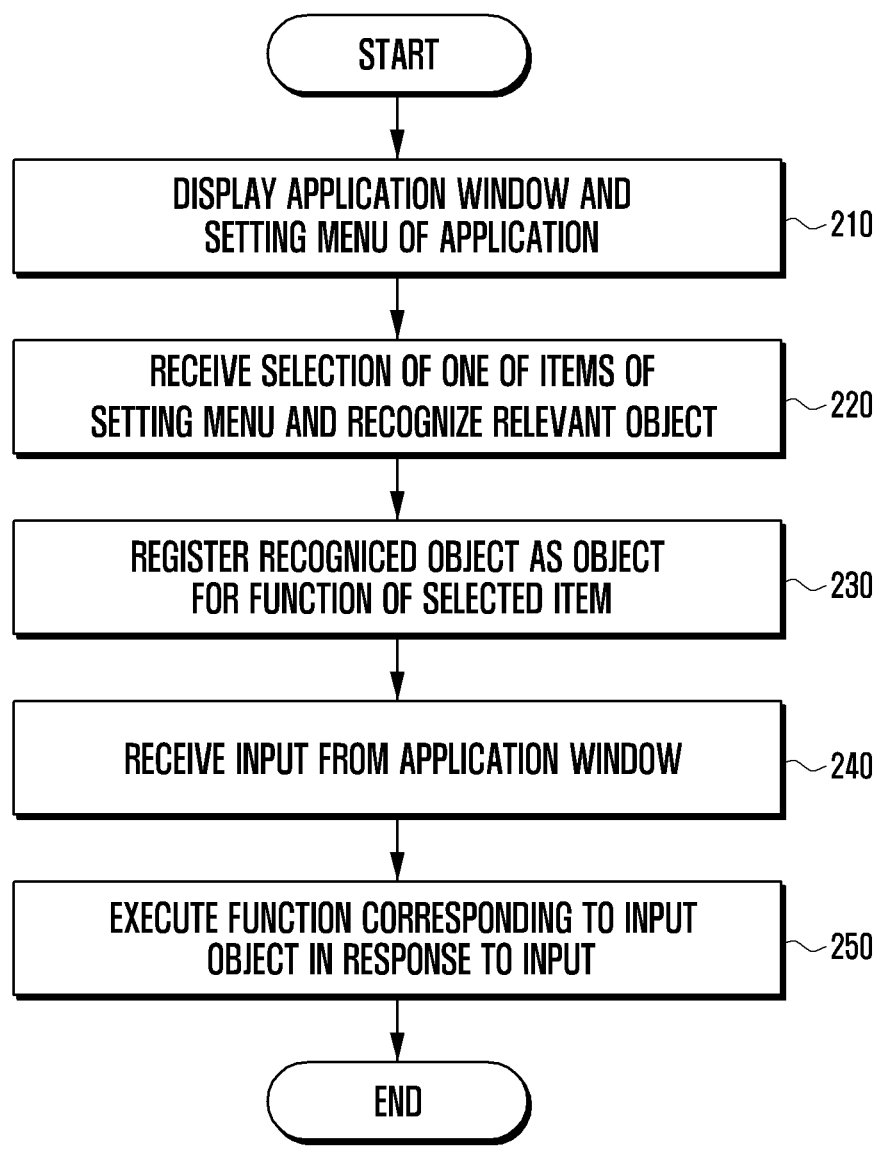
FIG. 2 is a flowchart illustrating a user input process according to an embodiment of the present invention.

FIG. 2 is a flowchart illustrating a user input process according to an embodiment of the present invention.

Referring to FIG. 2, in step 210, the controller 170 controls the electronic device to display an application window and a setting menu of application on the display unit 110. For example, the setting menu may be displayed on a part of the application window menu or the setting menu may be displayed to not overlap with the application window.

In step 220, the controller 170 receives a selection (e.g., a tap) of one of items of the setting menu from the touch panel 111, and recognizes the input object that performed the selection.

In step 230, the controller 170 registers information related to the recognized input object in the memory 160 so that the recognized input object is used as an object for executing the function of the selected item.

In step 240, the controller 170 receives an input of input object in the application window through the touch panel 110.

In step 250, the controller 170 executes a function corresponding to the input object, in response to the input.

FIGS. 3A, 3B, 3C, 3D, and 3E illustrate examples of screens that are displayed during a memo application according to an embodiment of the present invention.

Figure 3A:
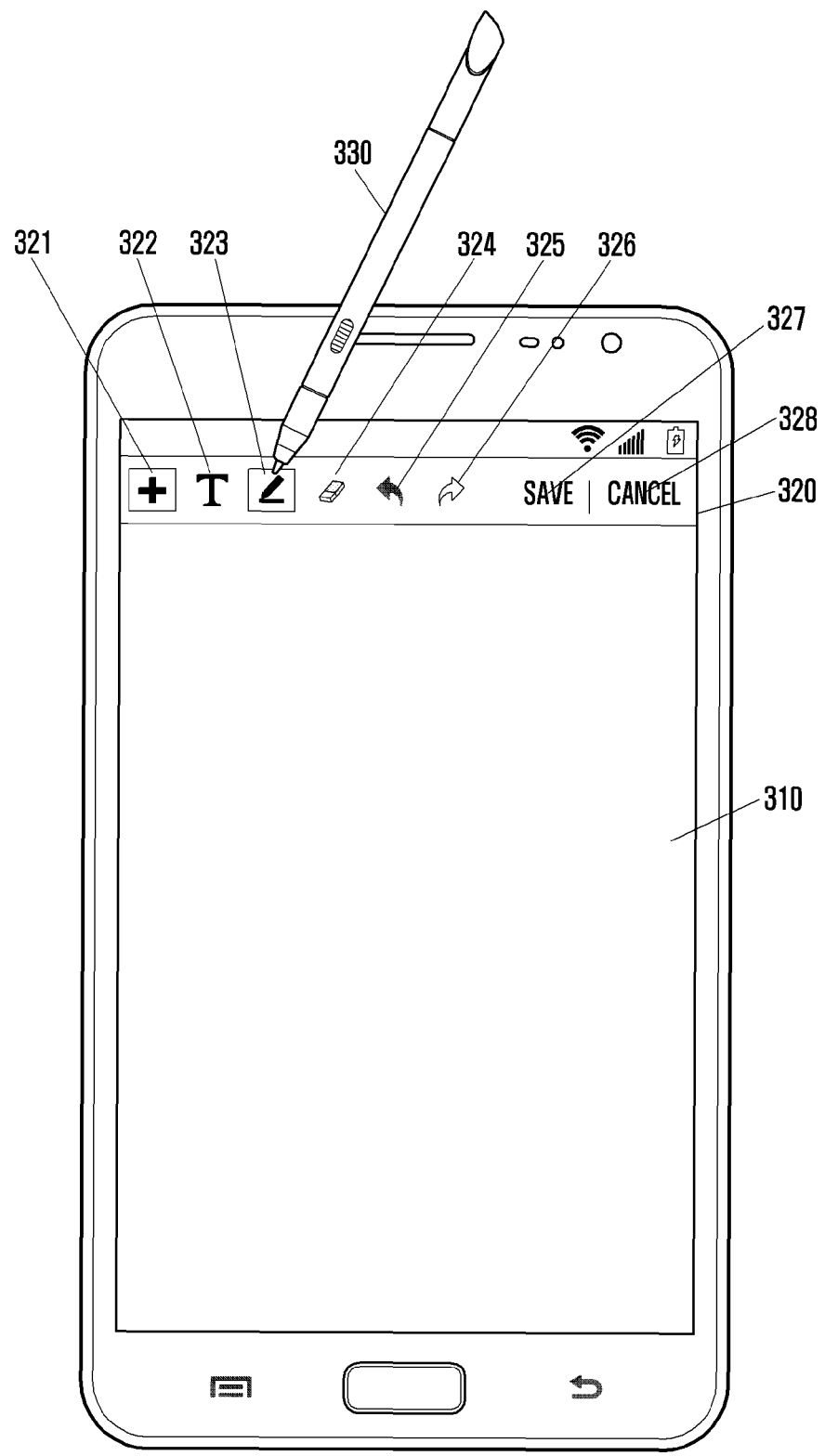
FIGS. 3A, 3B, 3C, 3D, and 3E illustrate examples of screens that are displayed during a memo application according to an embodiment of the present invention.

Referring to FIG. 3A, the display unit 110 displays a memo window 310 and a setting menu 320. The setting menu 320 includes items respectively corresponding to functions, i.e., a window open 321, a text input using keypad 322, a marker drawing 323, an eraser 324, an undo function 325, a redo function 326, a save function 327, and a cancel function 328. User may select (e.g., touch) an item corresponding to the marker 323 in the setting menu 320 using a pen 330. The controller 170 may register the marker drawing as a function performed by a pen 330 in response to input. Attributes (e.g., a thickness, a transparency, a color) of the brush may be established as a preset value.

As described above, when an item is selected by an input object, e.g., pen 330, the input object may be registered as an object for executing a function related to the selected item.

The setting menu 320 may further include items respectively corresponding to the functions such as a line drawing, a highlight function, and a figure drawing, etc.

Figure 3B:
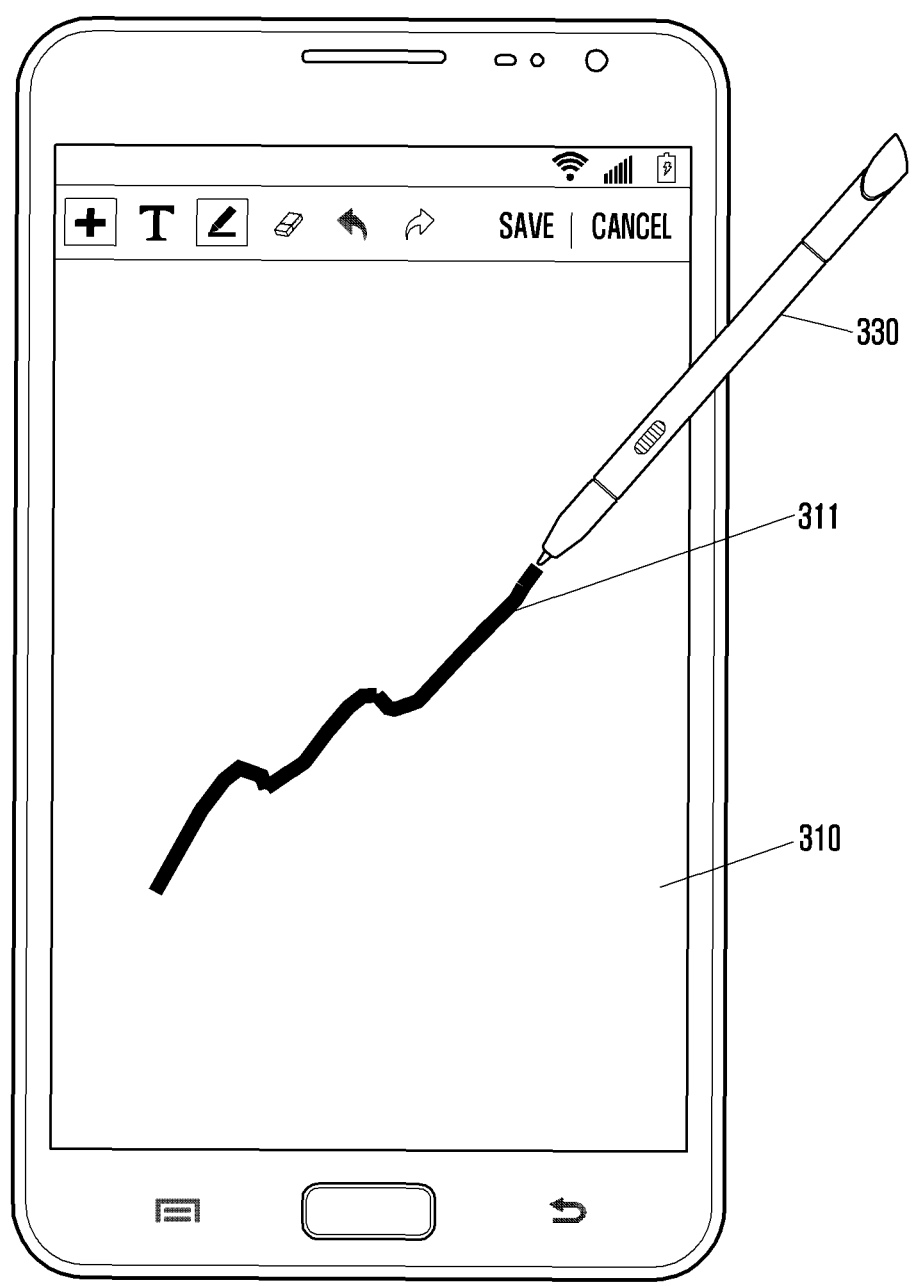

Referring to FIG. 3B, the user may move the pen 330 while touching the memo window 310. In response, the controller 170 may determine that the function registered for the pen 330 is a marker, recognize the movement of the pen 330, and control the display unit 110 to display a marking 311 in the recognized movement.

Figure 3C:
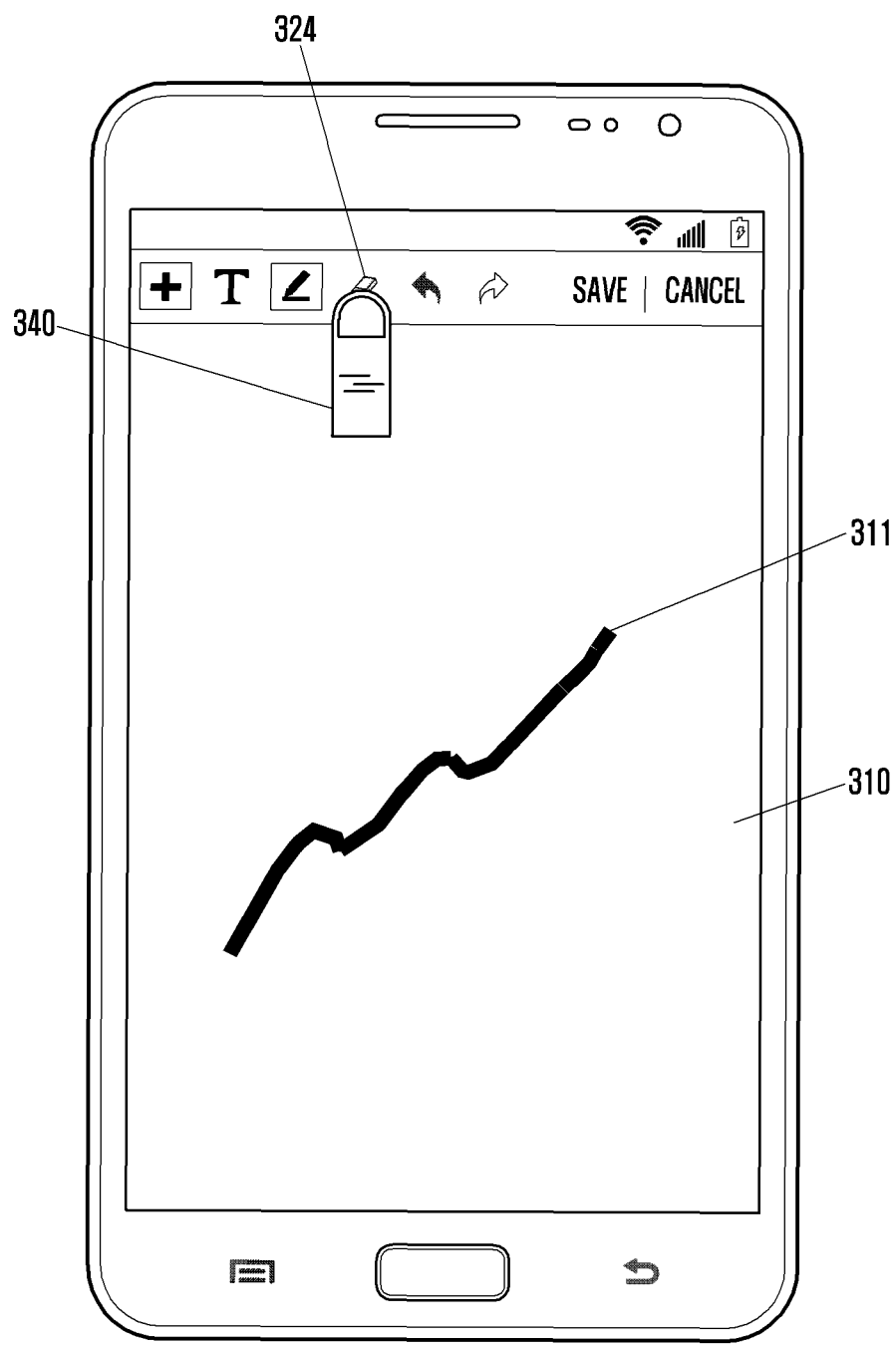

Referring to FIG. 3C, the user may tap the erase 324 in the setting menu 320 with a finger 340. In response, the controller 170 may register the erase 324 as a function to be performed by the finger 340. Thereafter, if the user taps eraser 324 with the pen 330, the pen 330 may be registered as an object for the eraser 324. In addition, the input object registered for making the marking 311, i.e., the opposite of erasing, may be automatically changed from the pen 330 to the finger 340.

Figure 3D:
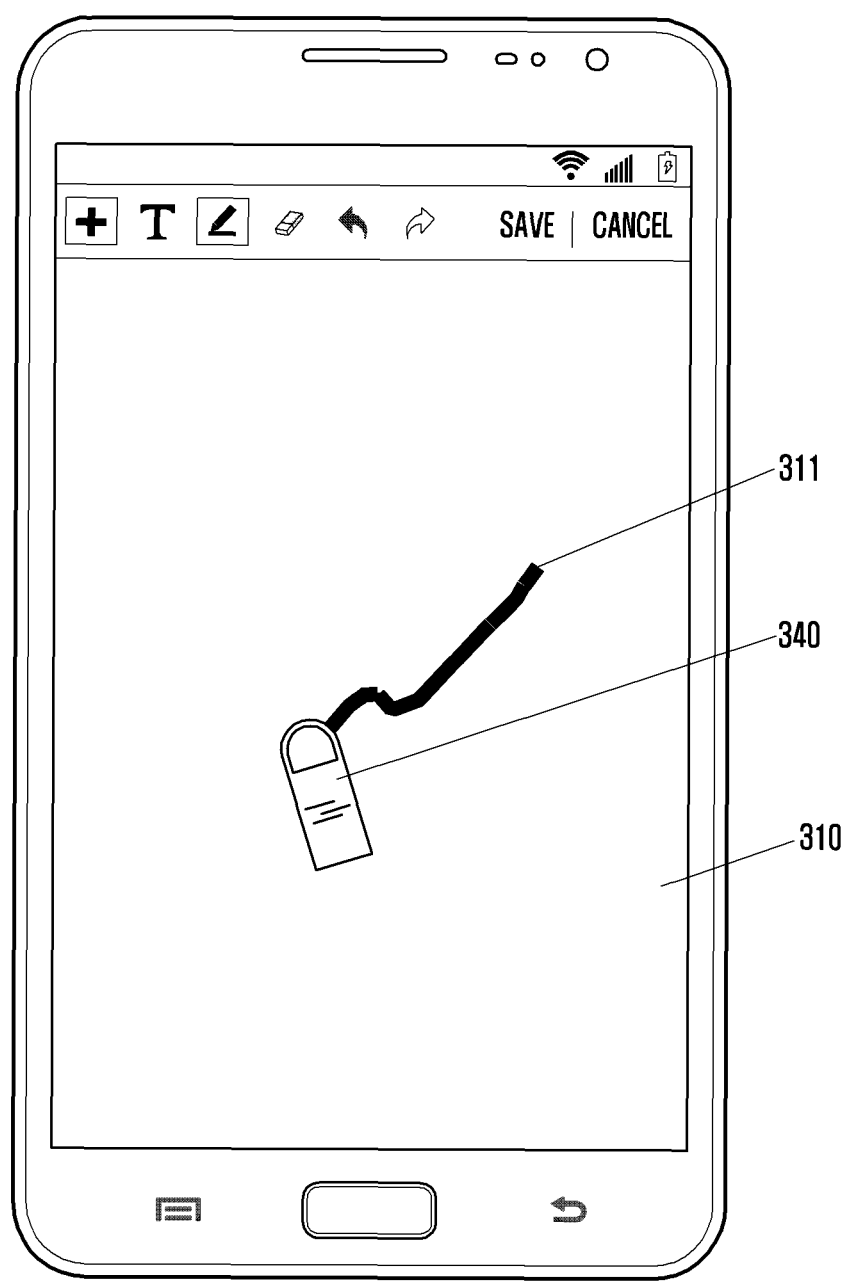

Referring to FIG. 3D, the user may move the finger 340 while touching the memo window 310. The controller 170 recognizing that the function registered for the finger 340 is the erase function then erases the part of the marking 311 that the finger 340 touches.

As described above with reference to FIGS. 3A to 3D, the controller 170 may differently register functions for each input object, e.g., the finger 340 and the pen 330.

In addition, the controller 170 may differently register the attribute (e.g., color, thickness, transparency, etc.) related to the function for each input object.

Figure 3E:
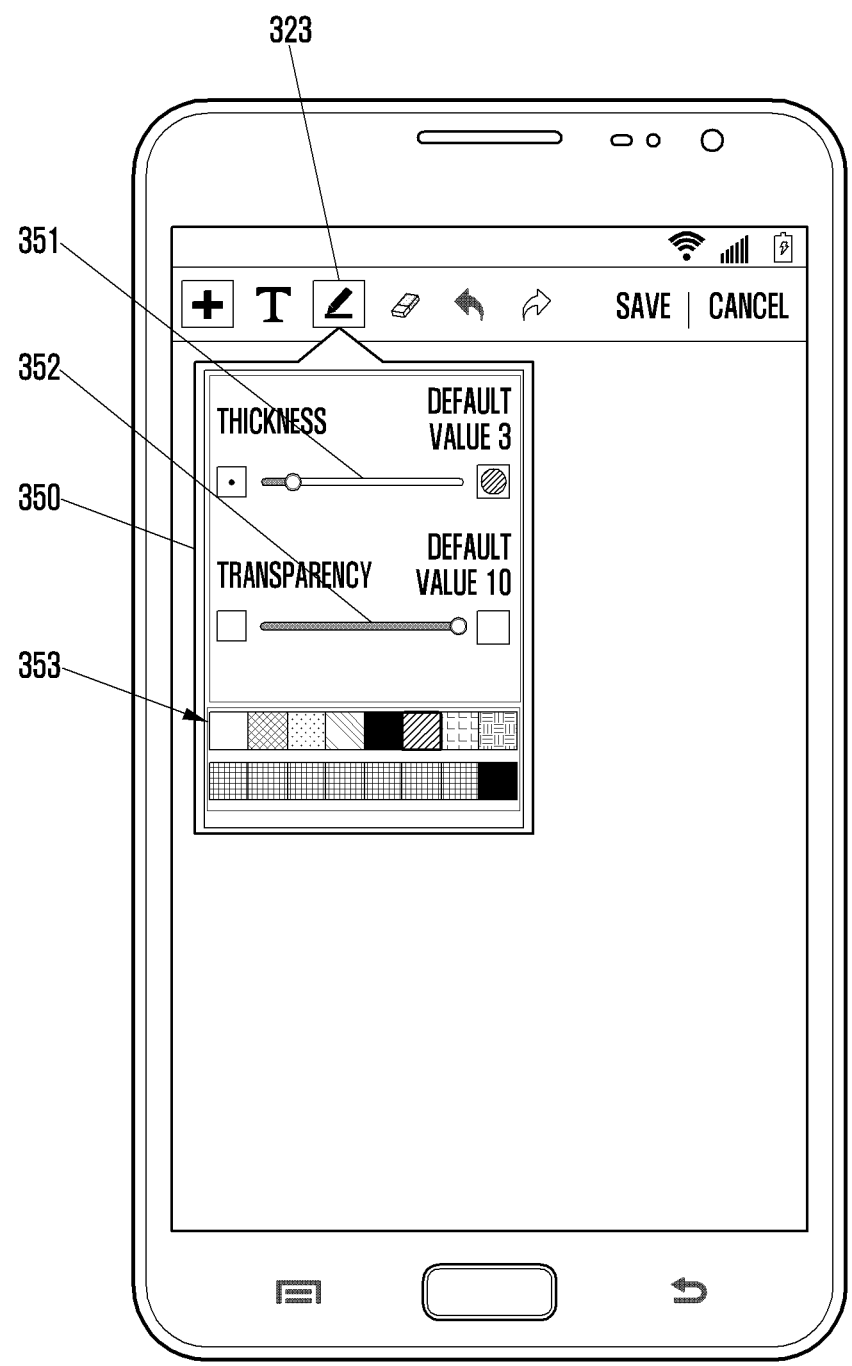

Referring to FIG. 3E, when a user selects (e.g., inputs a long tap) on the marker item 323 with the pen 330, the controller 170 may control the display unit 110 to display a sub setting menu 350 (e.g., a thickness adjustment bar 351, a transparency adjustment bar 352, and a color table 353) related to the marker 323.

Similarly, when user selects (e.g., taps) an arbitrary color with the pen in the color table 353, the controller 170 may register the selected color as an attribute of input by the pen 330. When user selects (e.g., inputs a long tap) the marker 323 with the finger 340, the controller 170 may also control the display unit 110 to display the sub setting menu 350. When user selects (e.g., taps) an arbitrary color with the finger in the color table 353, the controller 170 may register the selected color as an attribute of input by the finger 340. Thereafter, when the user moves the finger 340 while touching to the screen, the controller 170 may recognize the movement of the finger 340, and control the display unit 110 to display a mark of a corresponding color (e.g., blue) to the recognized movement.

In addition, when the user moves the pen 330 while touching to the screen, the controller 170 may recognize the movement of the pen 330, and control the display unit 110 to display a mark of corresponding color (e.g., red) to the recognized movement.

Figure 4A:
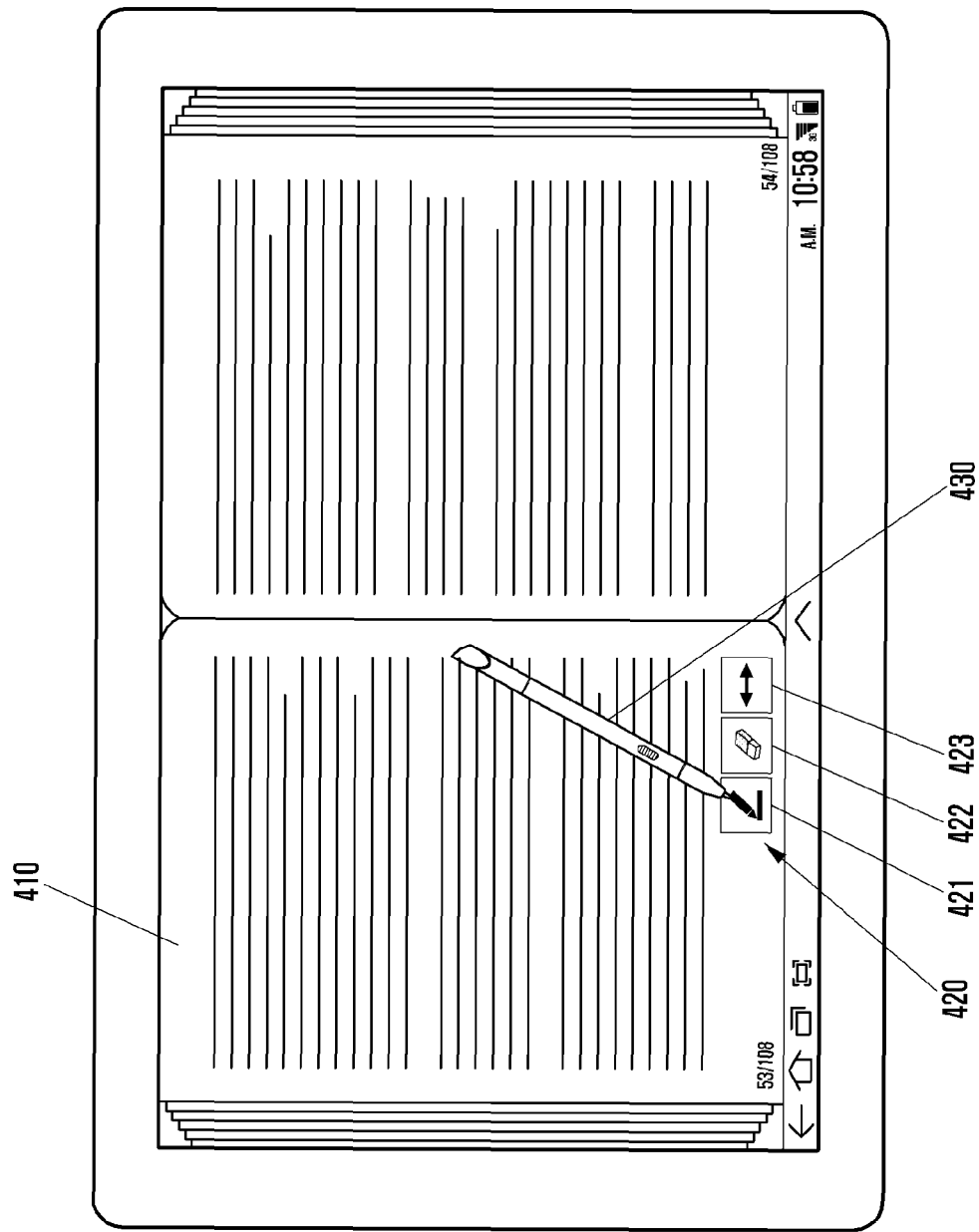
FIGS. 4A and 4B illustrate examples of screens that are displayed during an e-book application according to an embodiment of the present invention.
Figure 4B:
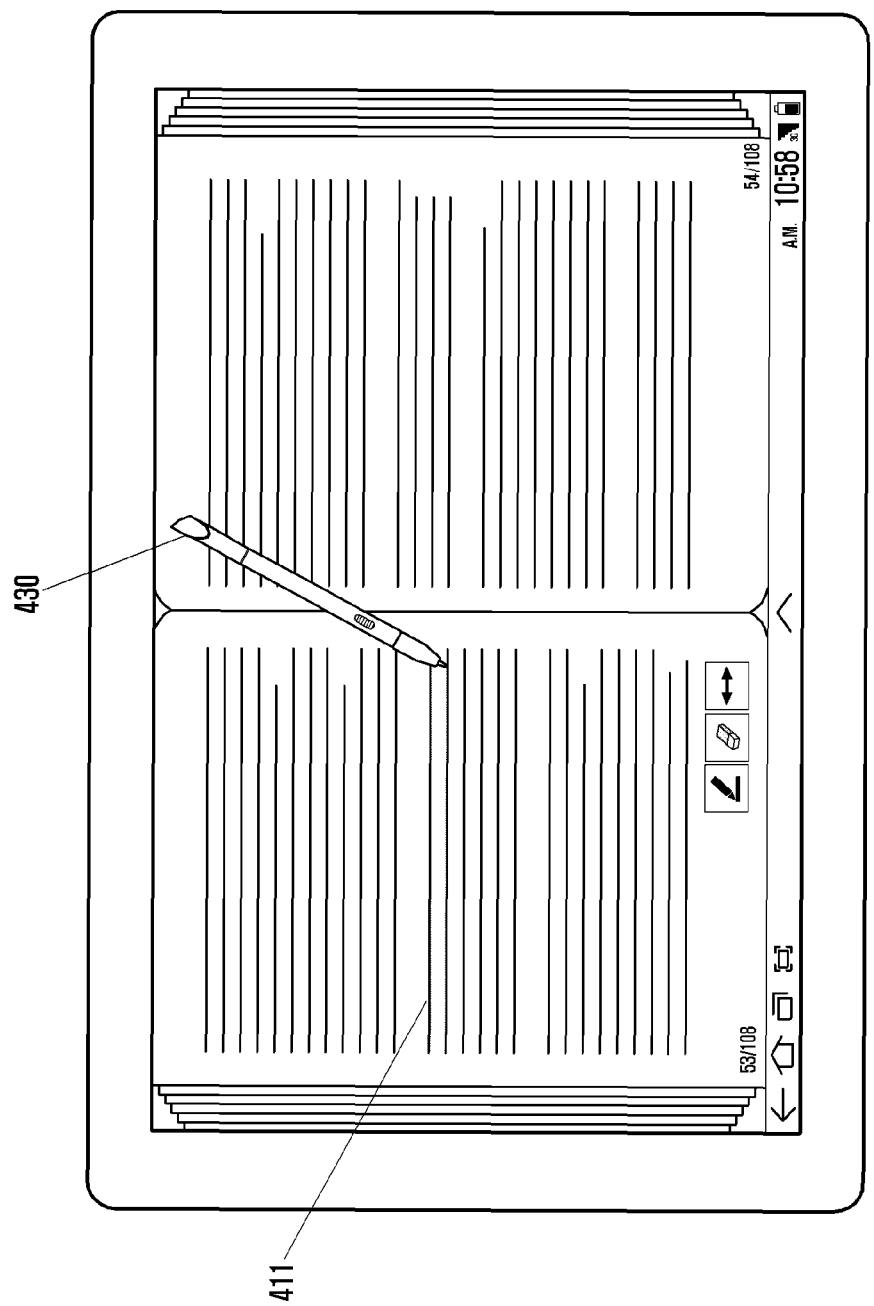

FIGS. 4A and 4B illustrate examples of screens that are displayed during an e-book application according to an embodiment of the present invention.

Referring to FIG. 4A, the display unit 110 displays a settings menu 420 on a part of a page 410. For example, the settings menu 420 includes a highlighter 421, an eraser 422, and a page turn function 423. User may tap the highlighter 421 in the settings menu 420 with the pen 430. In response, the controller 170 may register the highlighter 421 as a function performed by the pen 430.

Referring to FIG. 4B, the user may move the pen 430 while touching to the page 410. In response, the controller 170 determines that the function registered for the pen 430 is the highlighter 421, recognizes a movement of the pen 430, and controls the display unit 110 to highlight the recognized trajectory 411.

Figure 5:
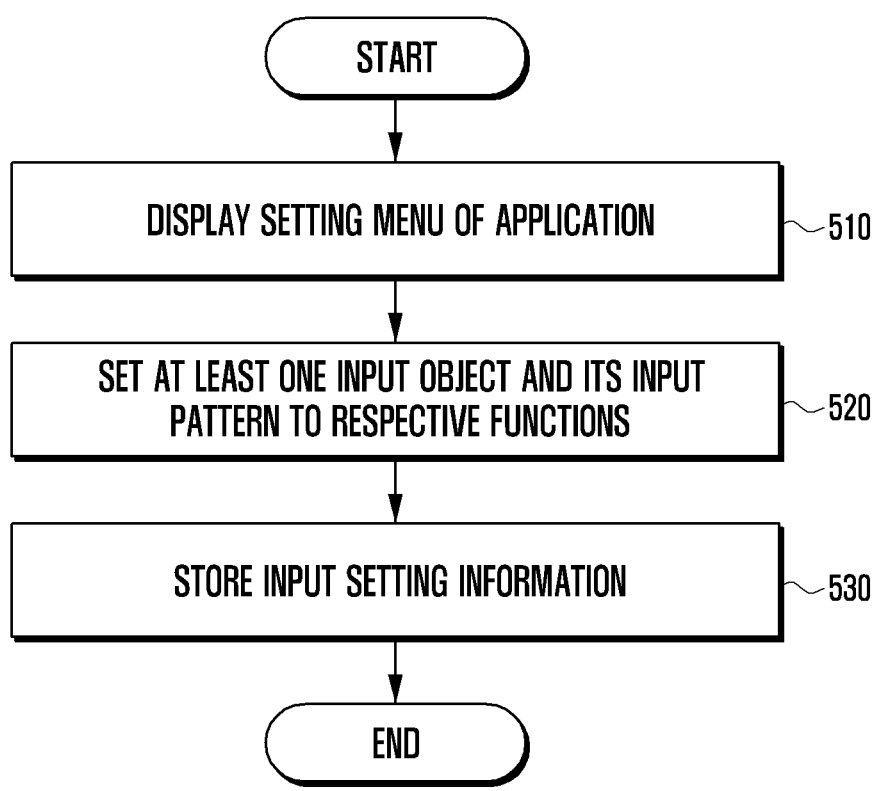
FIG. 5 is a flowchart illustrating a user input setting according to an embodiment of the present invention.

FIG. 5 is a flowchart illustrating a user input setting according to an embodiment of the present invention.

Referring to FIG. 5, in step 510, the controller 170 controls the display unit 110 to display the setting menu of application. For example, when an application window is displayed on a screen, user may press a menu key in the key input unit 120. In response, the controller 170 may control the display unit 110 to display the setting menu of corresponding application.

In step 520, the controller 170 sets at least one input object and its input pattern to respective functions of application in response to a user input.

In step 530, the controller 170 stores input setting information in the memory 160.

Figure 6A:
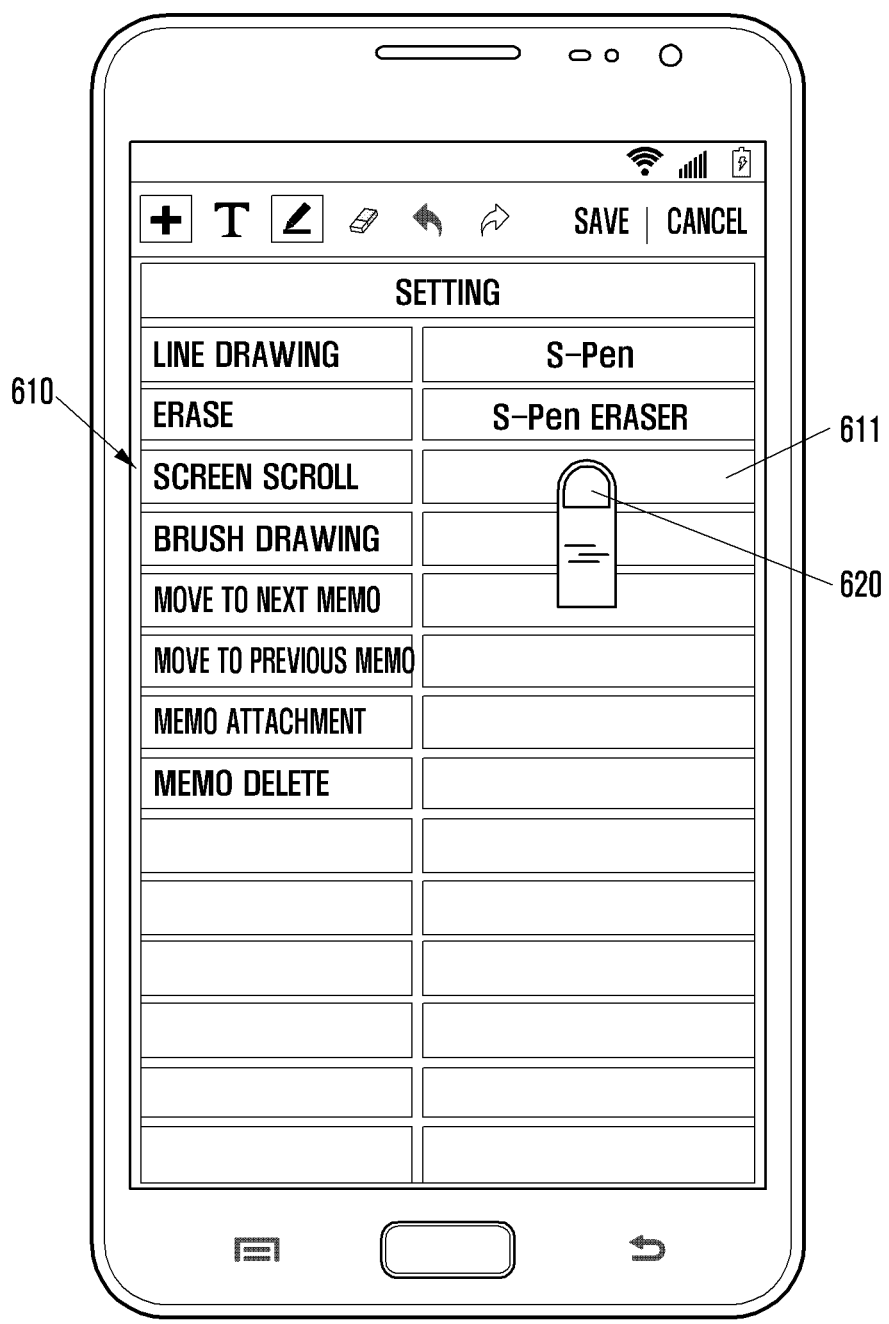
FIGS. 6A, 6B, and 6C illustrate examples of screens that are displayed during a memo application according to an embodiment of the present invention.
Figure 6B:
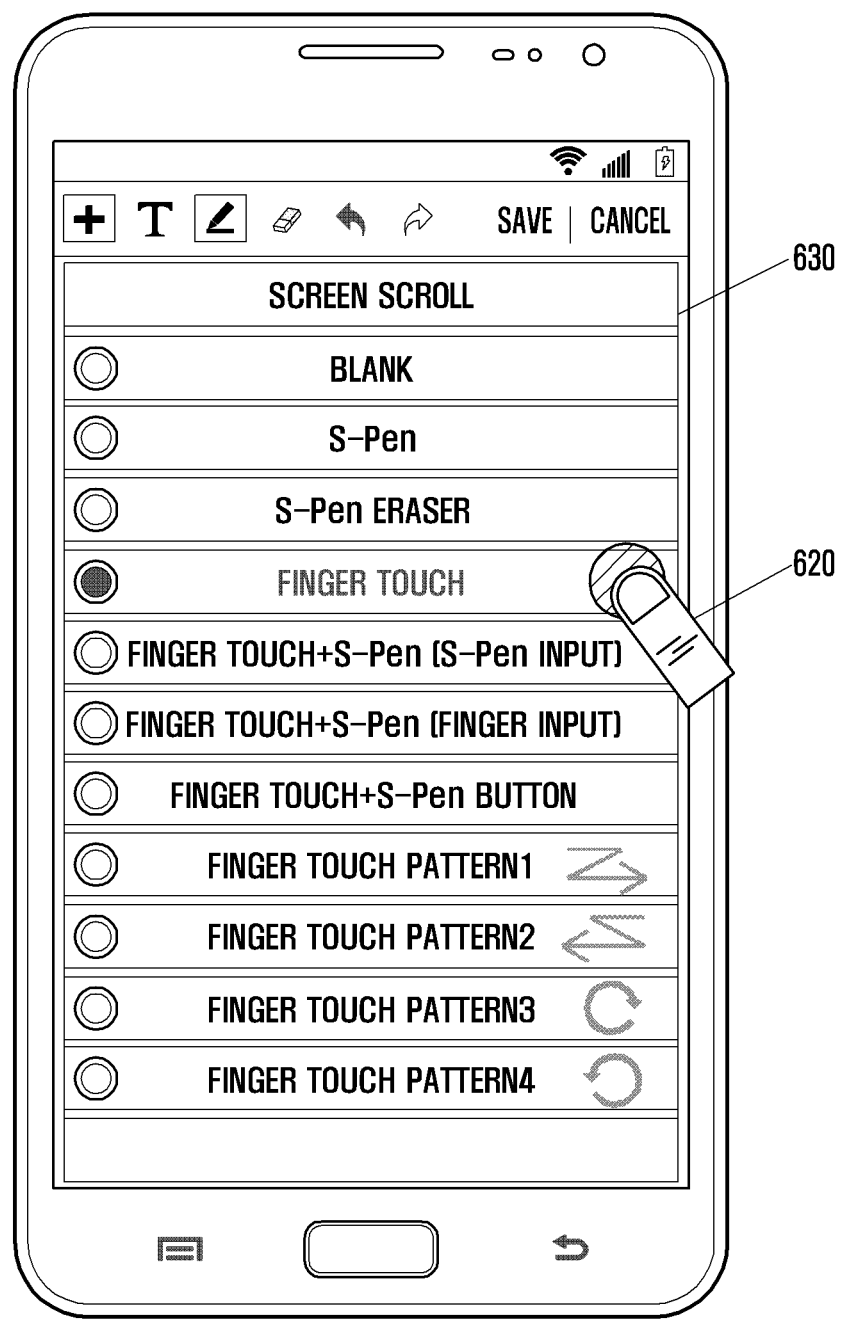
Figure 6C:
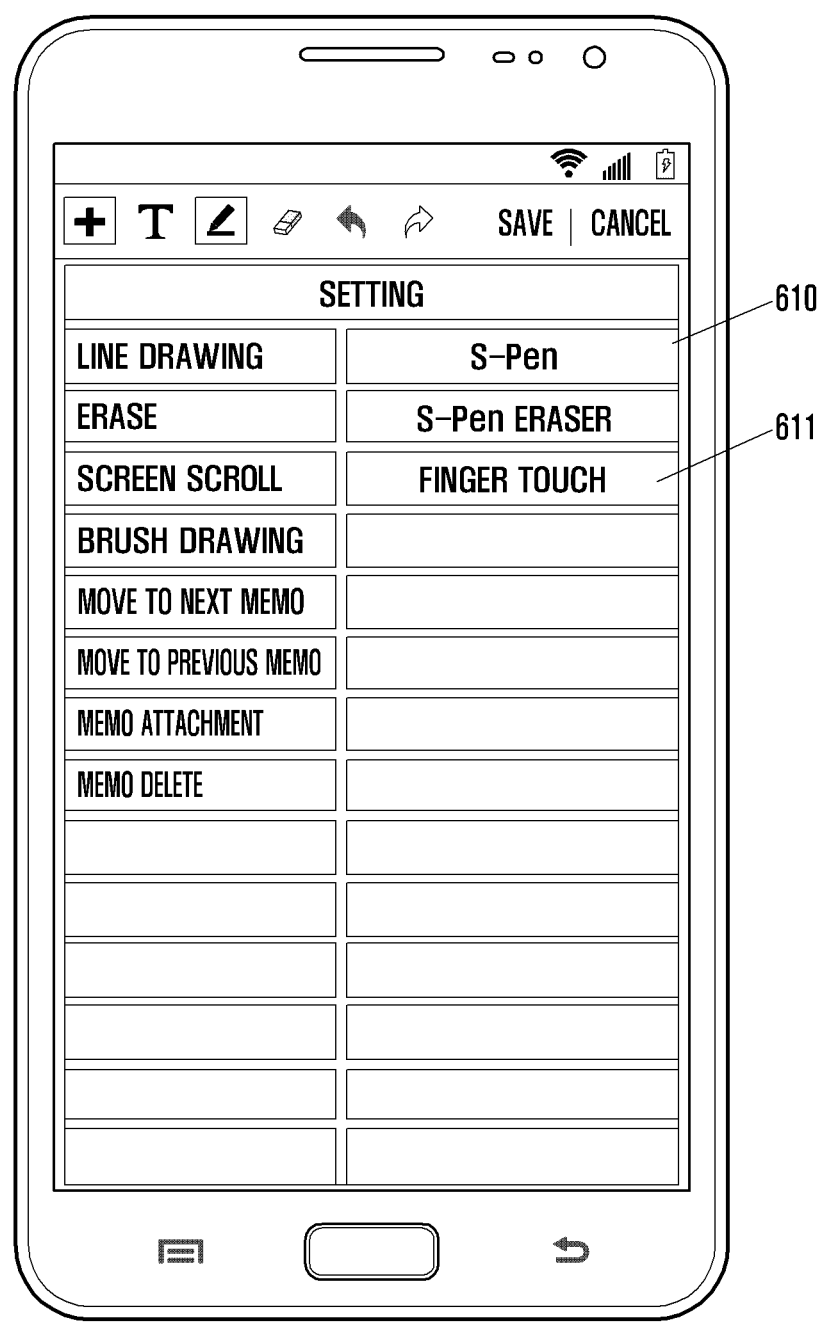

FIGS. 6A, 6B, and 6C illustrate examples of screens that are displayed during a memo application according to an embodiment of the present invention.

Referring to FIGS. 6A and 6B, the display unit 110 displays a setting menu 610 of a memo application. As illustrated in FIG. 6A, functions that can be set through the setting menu 610 include, for example, a line drawing, an erase, a screen scroll, a brush drawing, move to next memo, move to previous memo, memo attachment, and memo delete. The user may tap an item 611 of screen scroll with the input object, e.g., a finger 620, in the setting menu 610. In response, the controller 170 may control the display unit 110 to display an input list 630 as illustrated in FIG. 6B.

Referring to FIGS. 6B and 6C, the user may touch any one of the items of the input list 630, e.g., "finger touch" with the finger 620. Then, as illustrated in FIG. 6C, a finger touch may be set for the function screen scroll.

Figure 7:
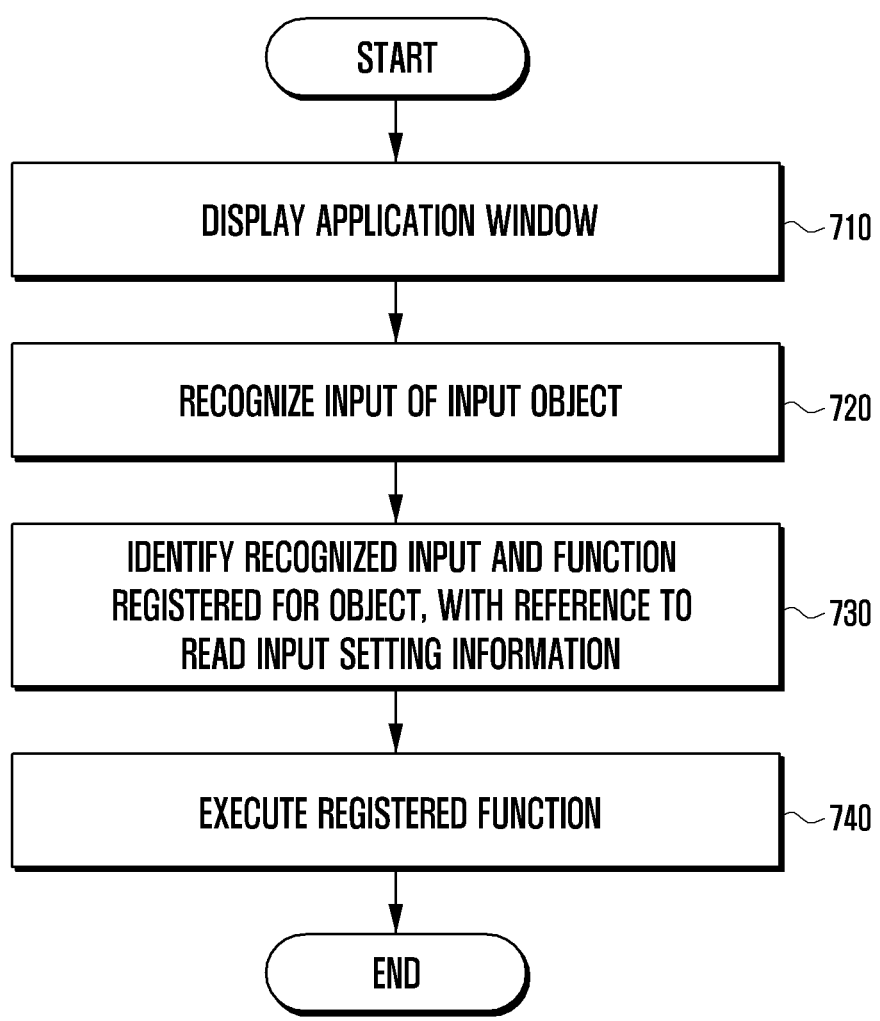
FIG. 7 is a flowchart illustrating a user input process according to an embodiment of the present invention.

FIG. 7 is a flowchart illustrating a user input process according to an embodiment of the present invention.

Referring to FIG. 7, in step 710, the controller 170 controls the display unit 110 to display an application window.

In step 720, the controller 170 analyzes detection information received from the touch panel 111, and recognizes an input of input object in the application window.

In step 730, the controller 170 reads input setting information previously stored in the memory 160, and identifies the recognized input and a function registered for the object, with reference to the read input setting information.

In step 740, the controller 170 executes the registered function.

Figure 8:
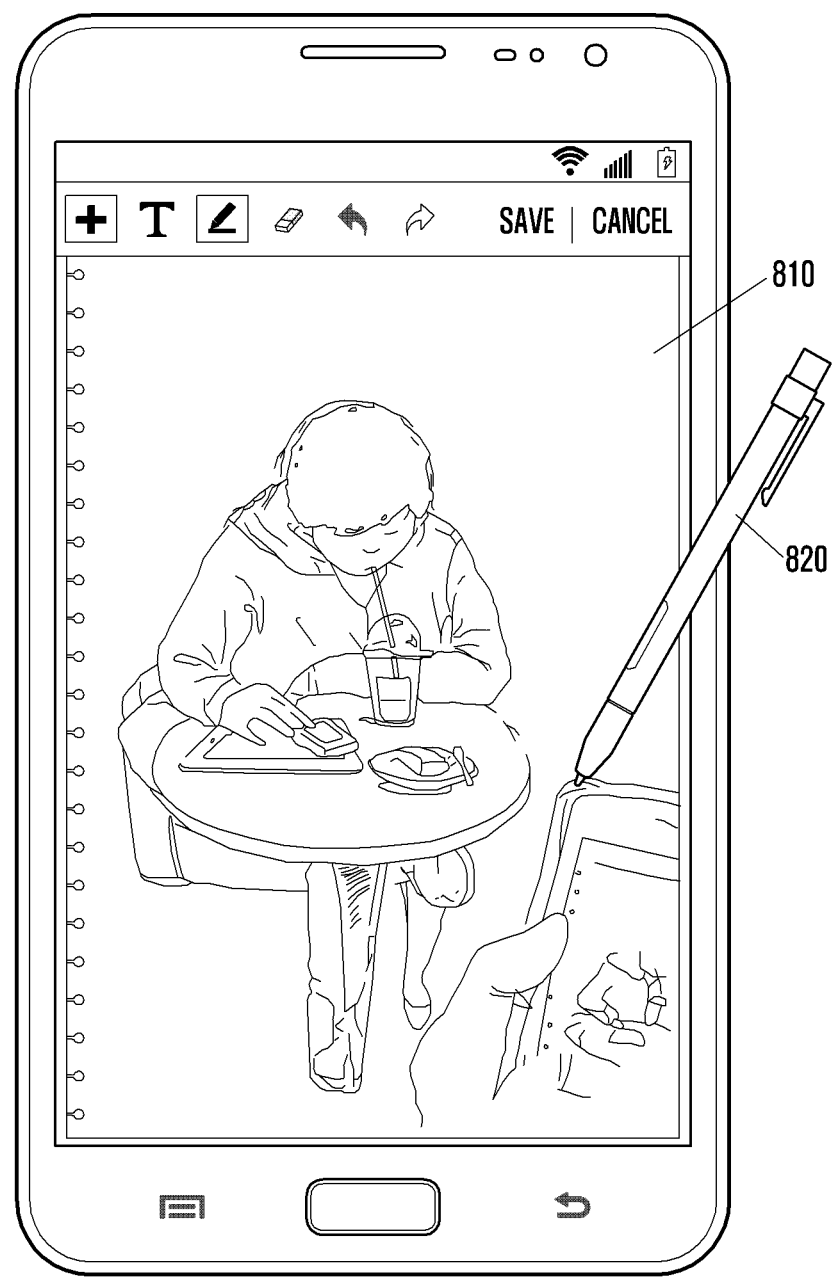
FIG. 8 illustrates an example of a screen that is displayed during a line drawing of a memo application according to an embodiment of the present invention.

FIG. 8 illustrates an example of a screen that is displayed during a line drawing of a memo application according to an embodiment of the present invention.

Referring to FIG. 8, the display unit 110 displays a memo window 810. The user may touch a pen 820 in the memo window 810. Then, the controller 170 may recognize that the function set for the pen touch is a "line drawing" by identifying the input setting information stored in the memory 160. The user may move the pen 820 while maintaining the touch so that the controller 170 recognizes a movement of the pen 820, and controls the display unit 110 to display a line in the recognized movement.

Figure 9:
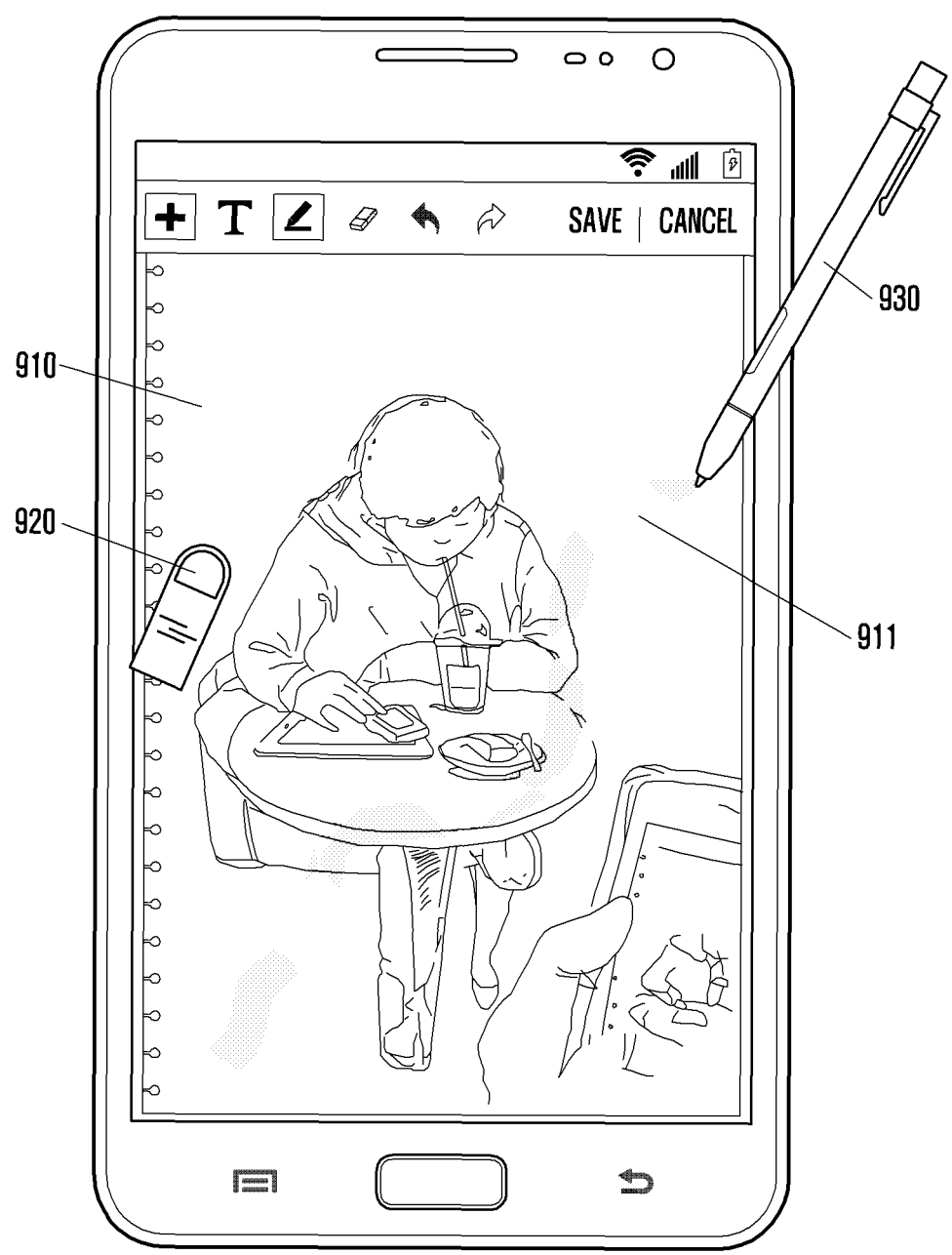
FIG. 9 illustrates an example of a screen that is displayed during a brush drawing of a memo application according to an embodiment of the present invention.

FIG. 9 illustrates an example of a screen that is displayed during a brush drawing of a memo application according to an embodiment of the present invention.

Referring to FIG. 9, the user may touch a finger 920 to a memo window 910, and while also moving a pen 930 across the memo window 910. The controller 170 recognizes that the function set for the finger 920 touch and the movement of pen 930 is a "marker drawing" by identifying the input setting information stored in the memory 160. Thus, the controller 170 may recognize the movement of the pen 930, and control the display unit 110 to display a marking 911 in the recognized movement.

Figure 10A:
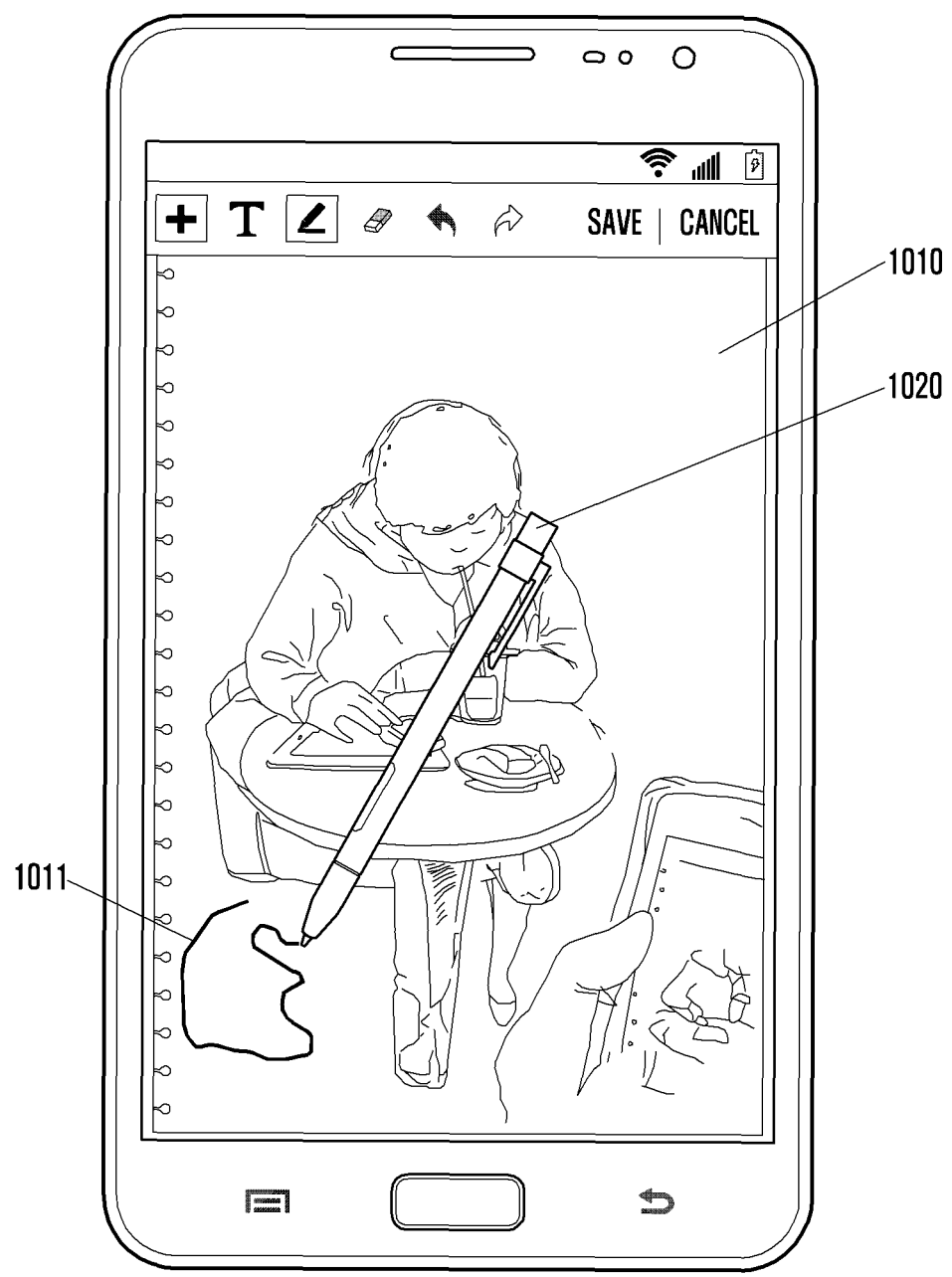
FIGS. 10A and 10B illustrate examples of screens that are displayed during erasing of a memo application according to an embodiment of the present invention.
Figure 10B:
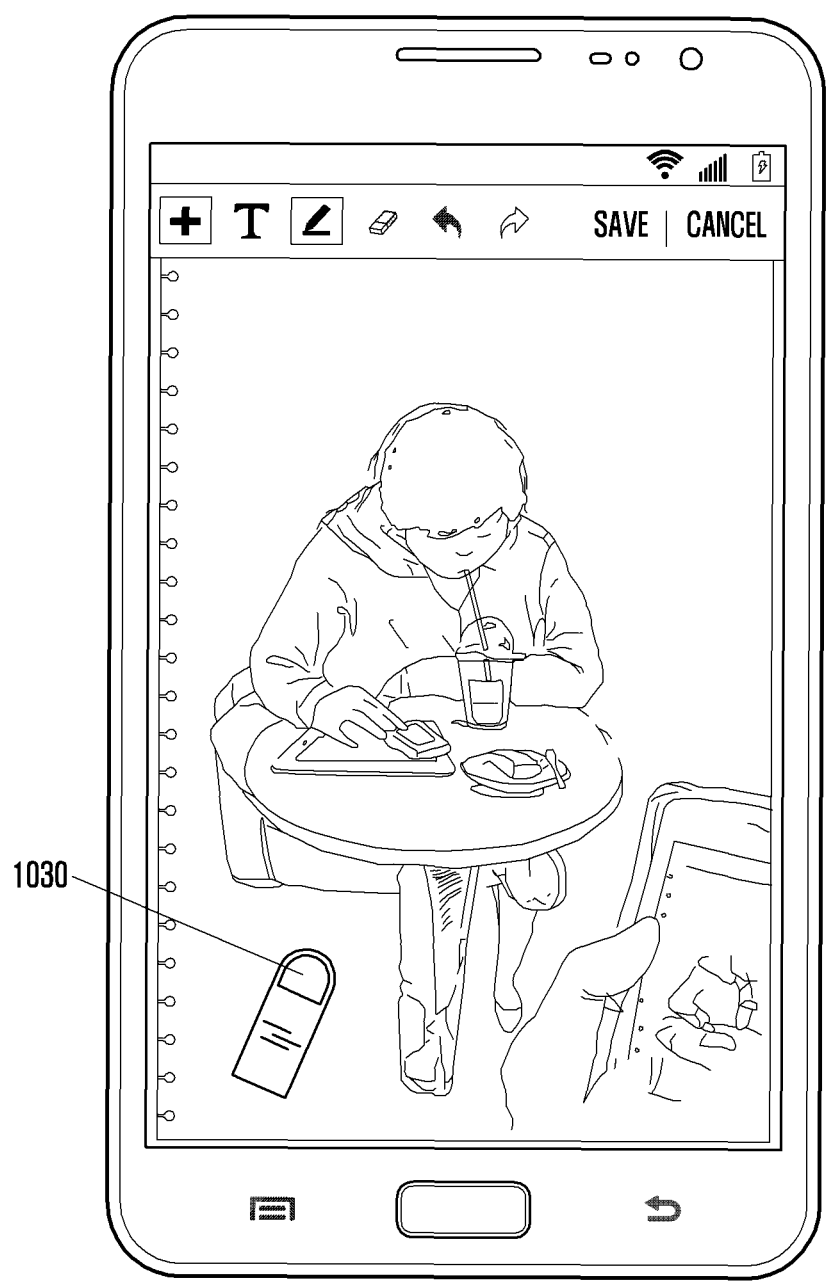

FIGS. 10A and 10B illustrate examples of screens that are displayed during erasing of a memo application according to an embodiment of the present invention.

Referring to FIG. 10A, the display unit 110 displays a memo window 1010. The user may touch a pen 1020 to the memo window 1010 so that the controller 170 recognizes that the function set for the pen touch is a "line drawing" by identifying the input setting information stored in the memory 160. The user may then move the pen 1020 while maintaining the touch. The controller 170 recognizes the movement of the pen 1020, and controls the display unit 110 to display a line 1011 in the recognized movement.

Referring to FIG. 10B, user may touch a finger 1030 in the memo window 1010. The controller 170 then recognizes that the function set for the finger touch is "erase" by identifying the input setting information stored in the memory 160. The user may then move the finger 1030 while maintaining the touch. The controller 170 then recognizes the movement of the finger 1030, and erases the line 1011 in the recognized movement.

Figure 11A:
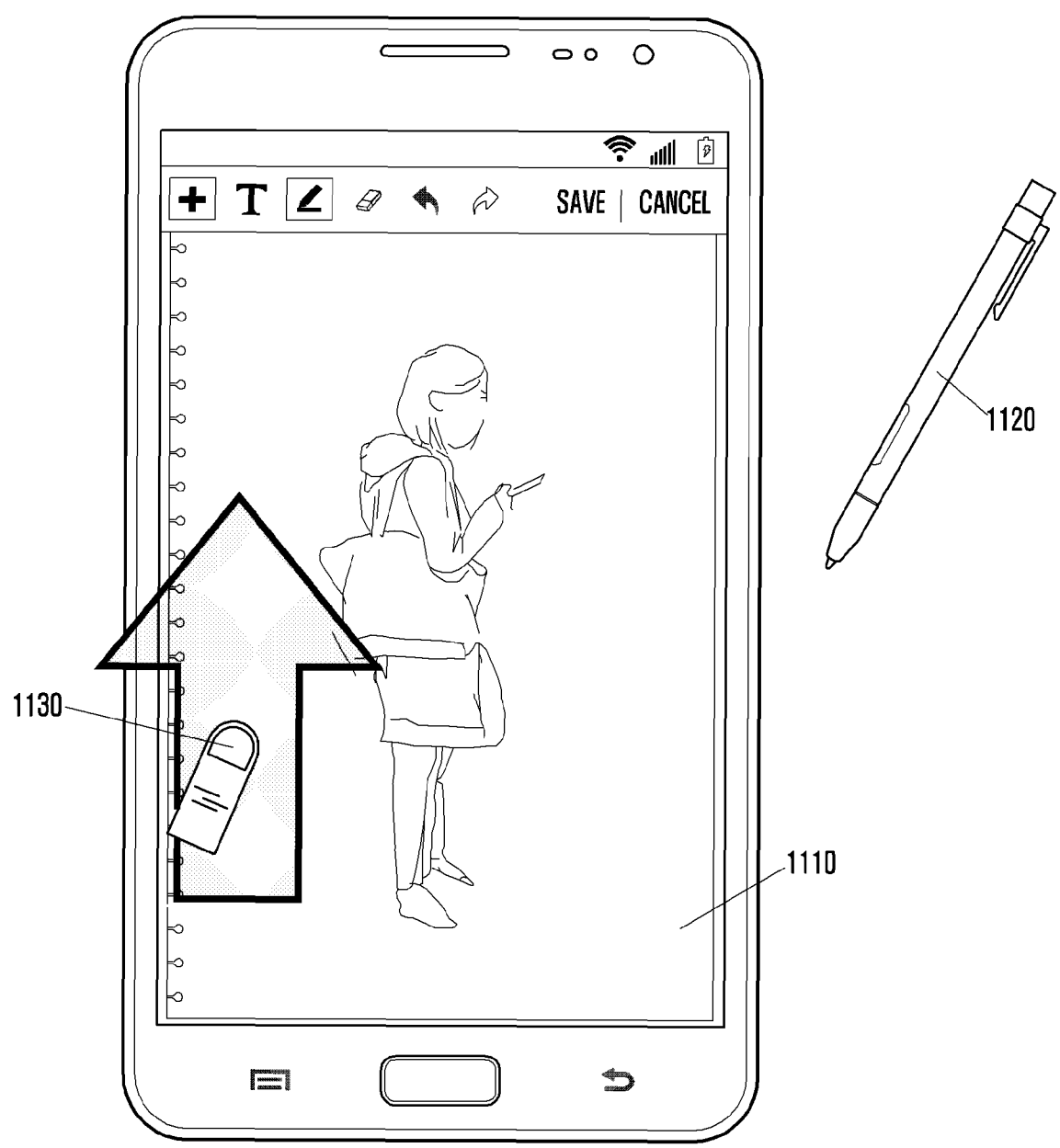
FIGS. 11A and 11B illustrate examples of screens that are displayed during a screen scroll of a memo application according to an embodiment of the present invention.
Figure 11B:
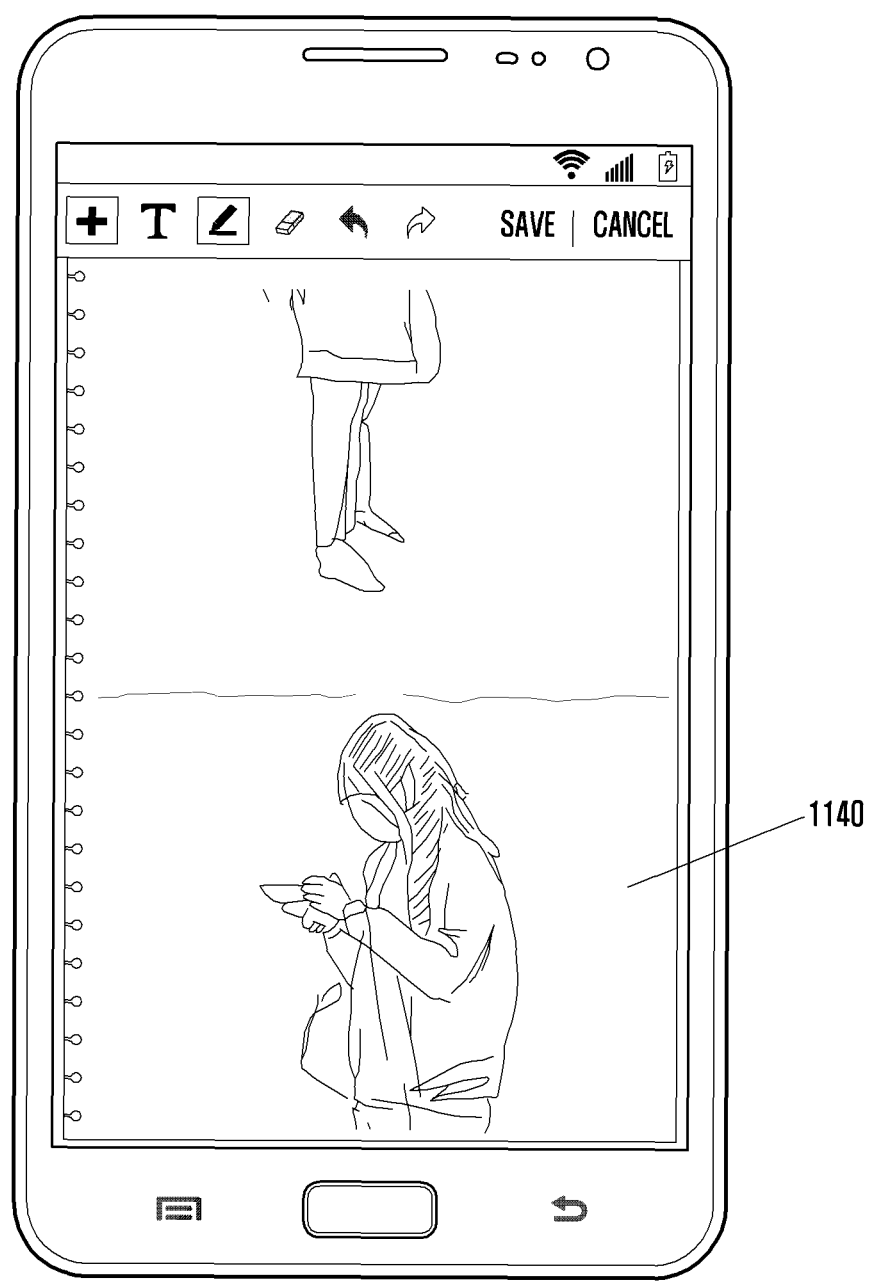

FIGS. 11A and 11B illustrate examples of screens that are displayed during a screen scroll of a memo application according to an embodiment of the present invention.

Referring to FIG. 11A, the display unit 110 displays a part 1110 of a memo window. The user drags a finger 1130 upward while pressing a button provided in a pen 1120. The controller 170 recognizes that the function set for a user input (a pen button press and a finger drag) is a "screen scroll" by identifying the input setting information stored in the memory 160.

Referring to FIG. 11B, the controller 170 controls the display unit 110 to display another part 1140 of the memo window in response to the user input.

Figure 12A:
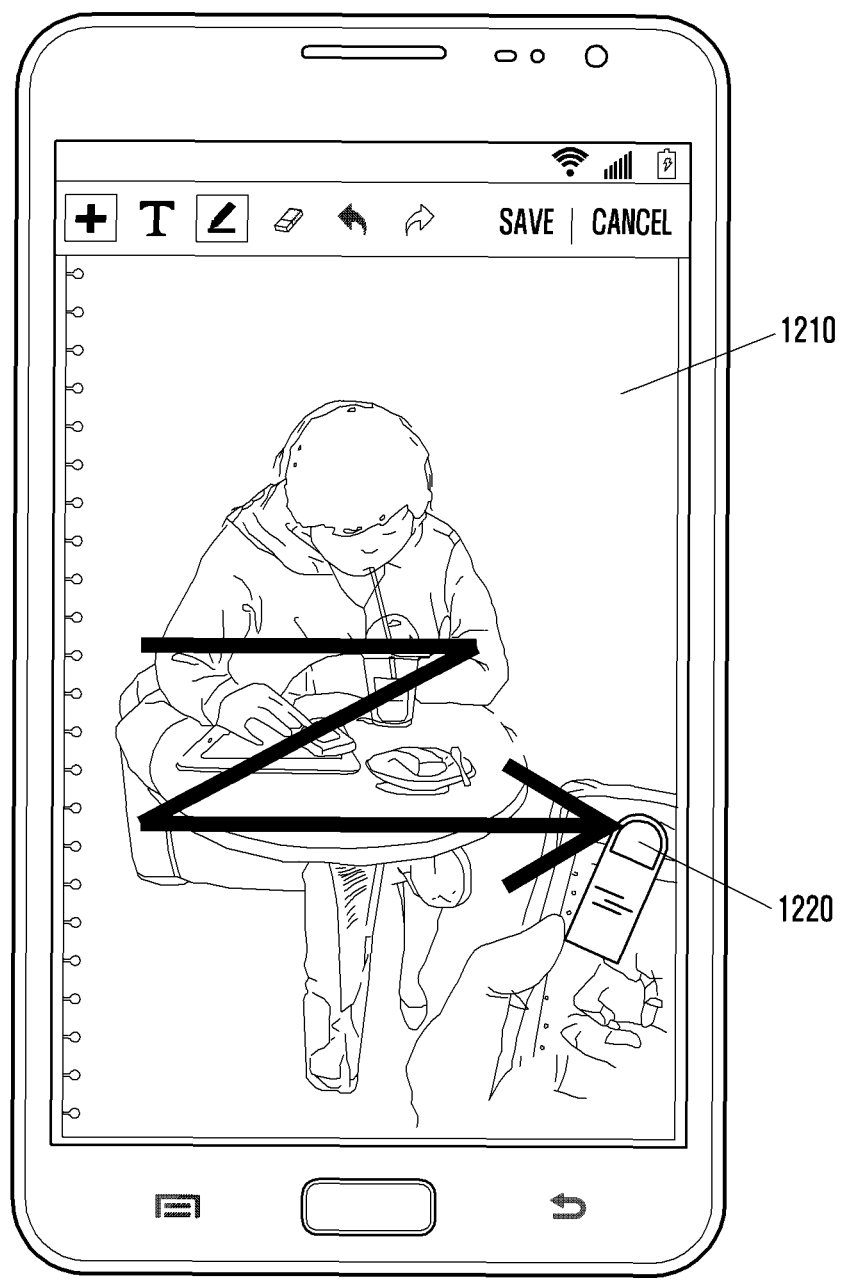
FIGS. 12A and 12B illustrate examples of screens that are displayed during a memo change of a memo application according to an embodiment of the present invention.
Figure 12B:
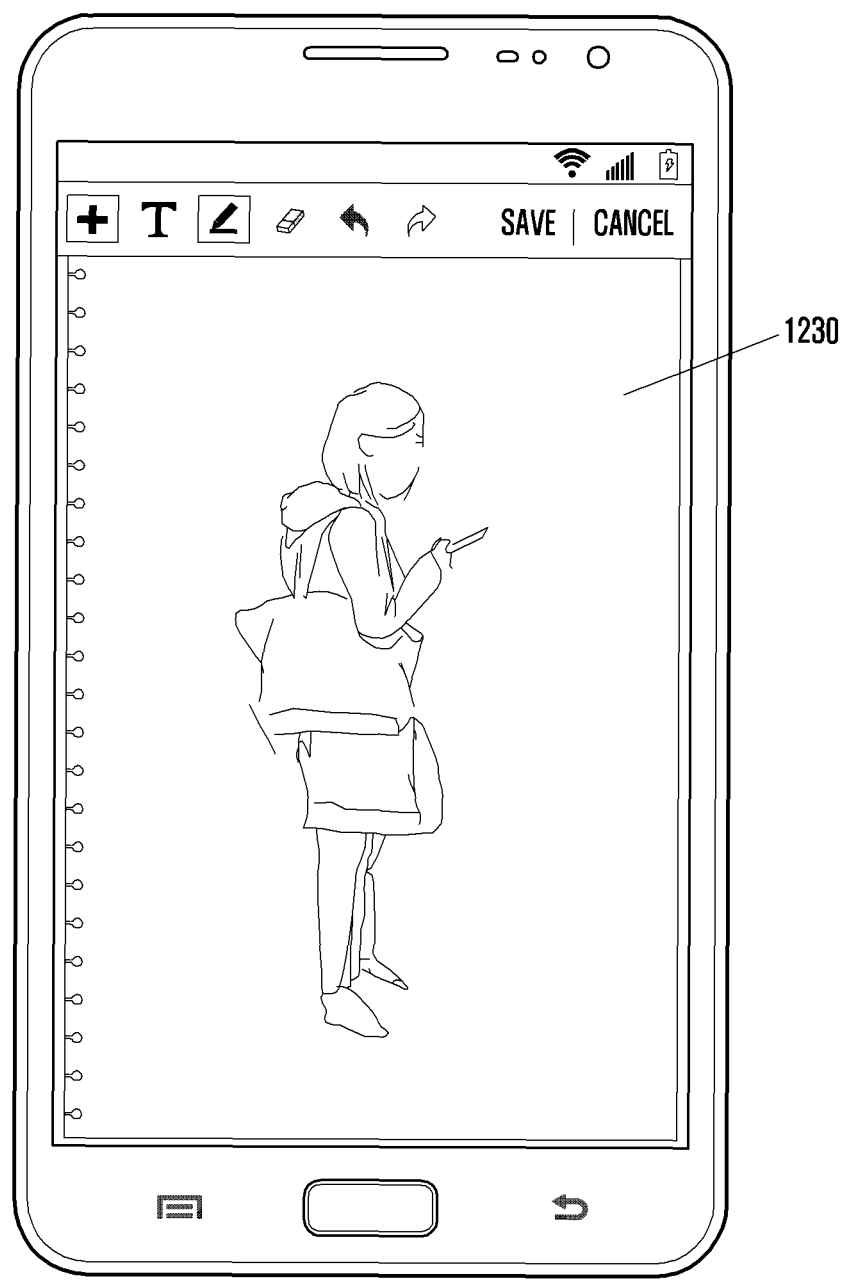

FIGS. 12A and 12B illustrate examples of screens that are displayed during a memo change of a memo application according to an embodiment of the present invention.

Referring to FIG. 12A, the display unit 110 displays a display window 1210 on a screen. The user gestures, e.g., finger pattern 1 of FIG. 20, with a finger 1220, while touching (or hovering over) a memo window 1210. The controller 170 recognizes that the function set for the input finger pattern 1 is a "move to next memo" by identifying the input setting information stored in the memory 160.

Referring to FIG. 12B, the controller 170 controls the display unit 110 to display a next memo window 1230 in response to the user input.

Figure 13:
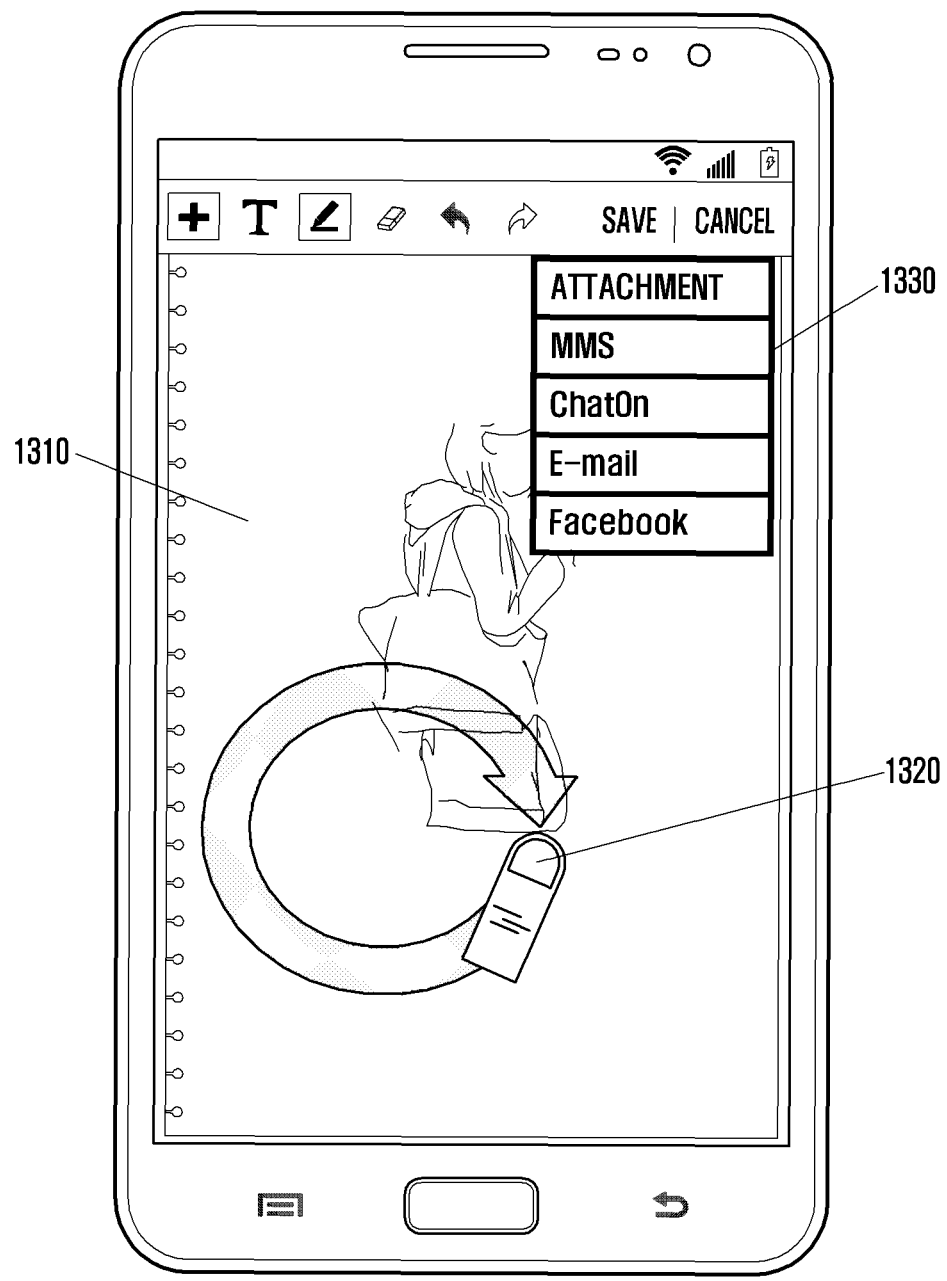
FIG. 13 illustrates an example of a screen that is displayed during a memo attachment of a memo application according to an embodiment of the present invention.

FIG. 13 illustrates an example of a screen that is displayed during a memo attachment of a memo application according to an embodiment of the present invention.

Referring to FIG. 13, the user gestures, e.g., finger pattern 3 of FIG. 20, with a finger 1320 while touching (or hovering over) a memo window 1310. The controller 170 recognizes that the function set for the input finger pattern 3 is a "memo attachment" by identifying the input setting information stored in the memory 160. Thus, the controller 170 controls the display unit 110 to display an attachment target application list 1330 in response to the user input.

Figure 14:
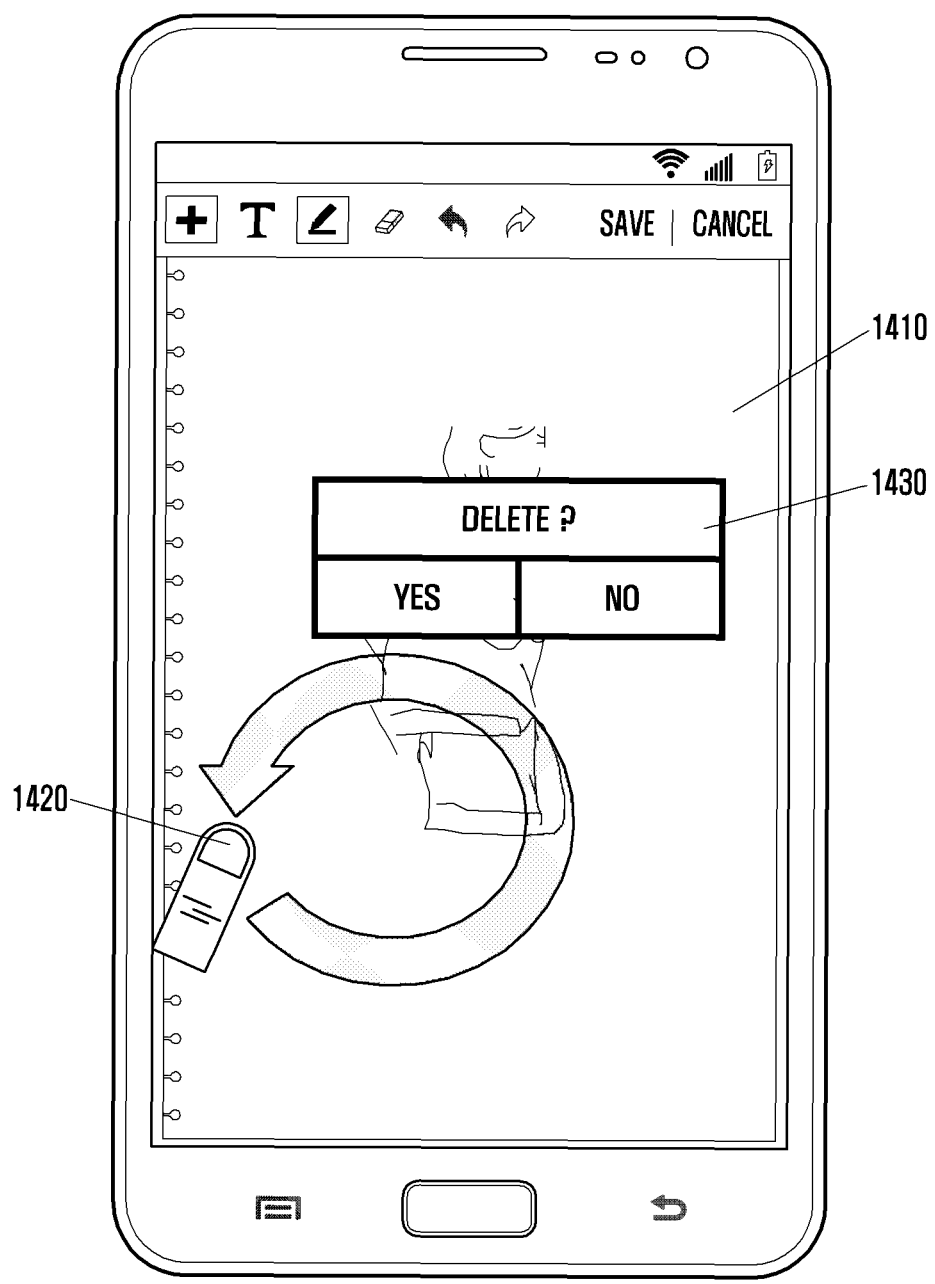
FIG. 14 illustrates an example of a screen that is displayed during a memo erase of a memo application according to an embodiment of the present invention.

FIG. 14 illustrates an example of a screen that is displayed during a memo erase of a memo application according to an embodiment of the present invention.

Referring to FIG. 14, the user gestures, e.g., finger pattern 4 of FIG. 20, with a finger 1420 while touching (or hovering over) a memo window 1410. The controller 170 recognizes that the function set for the input finger pattern 4 is a "memo erase" by identifying the input setting information stored in the memory 160. Thus, the controller 170 controls the display unit 110 to display a pop up window 1430 asking whether to delete a memo in response to a user input.

Figure 15:
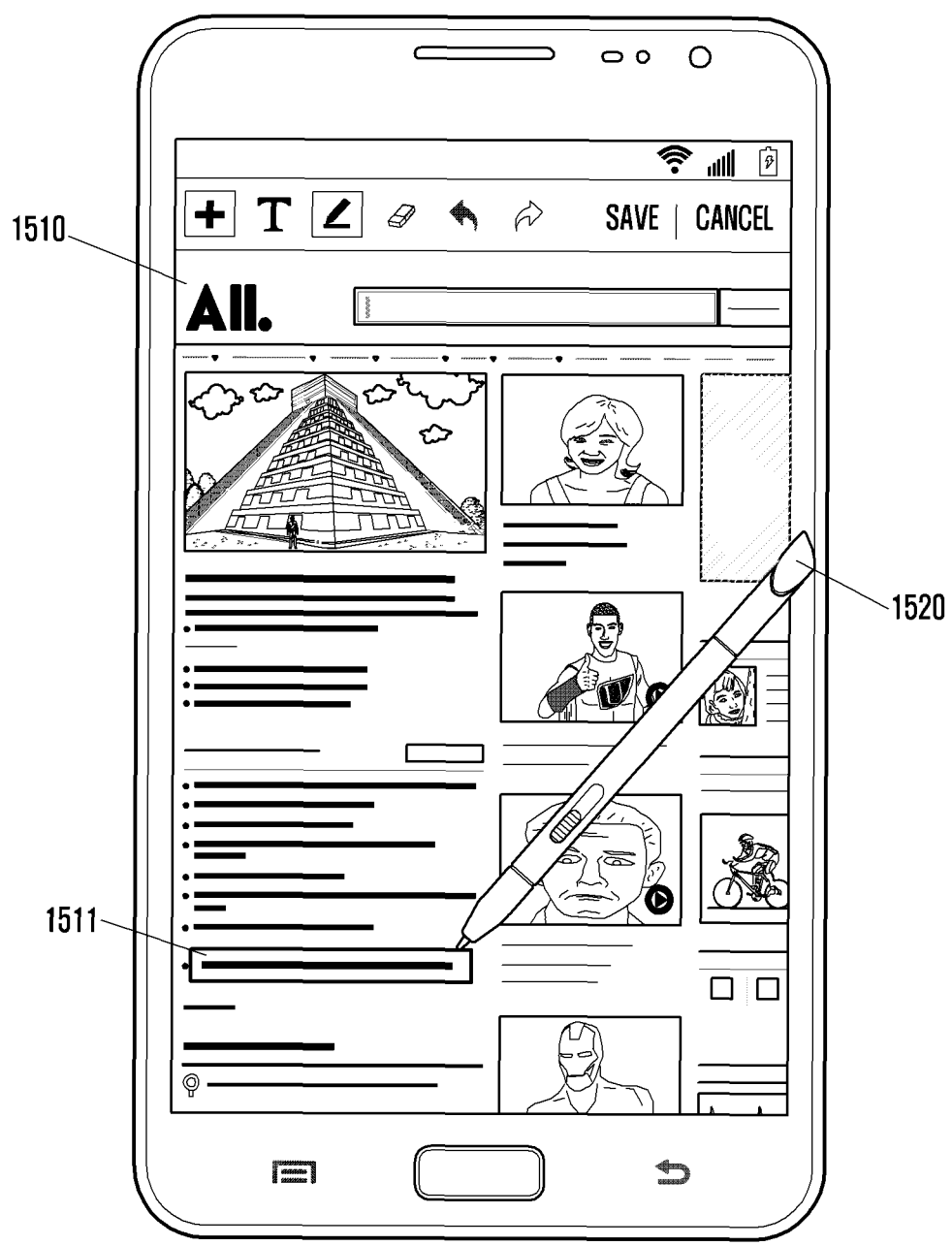
FIG. 15 illustrates an example of a screen that is displayed during a link selection of a web browser according to an embodiment of the present invention.

FIG. 15 illustrates an example of a screen that is displayed during a link selection of a web browser according to an embodiment of the present invention.

Referring to FIG. 15, a user may touch an arbitrary object 1511 on a web page 1510 with a pen 1520. In response, the controller 170 recognizes that the function set for the pen-touch is a "link selection" by identifying the input setting information stored in the memory 160. Thus, the controller 170 controls the wireless communication unit 130 to download a web page linked to the touched object 1511 in response to a user input, and controls the display unit 110 to display a corresponding web page received from the wireless communication unit 130.

Figure 16:
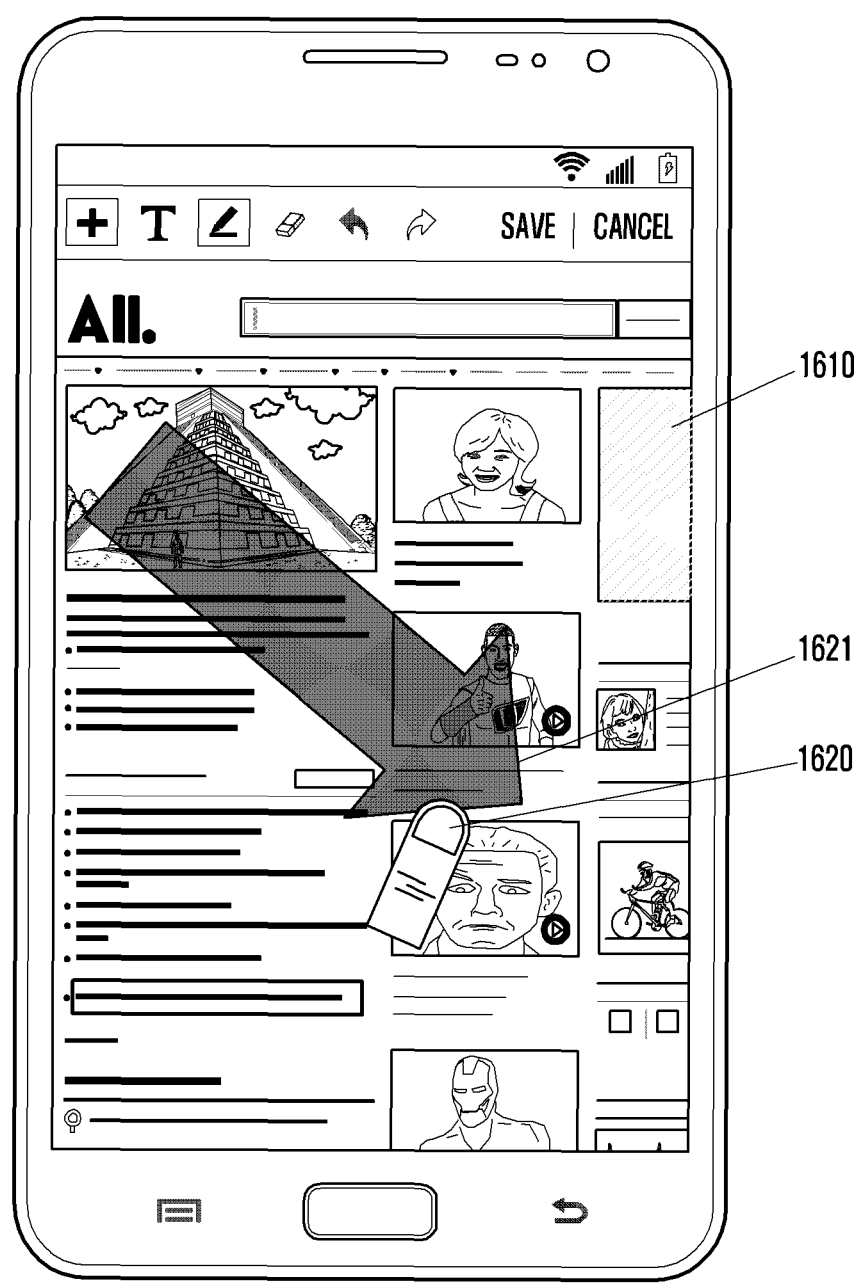
FIG. 16 illustrates an example of a screen that is displayed during a screen scroll of a web browser according to an embodiment of the present invention.

FIG. 16 illustrates an example of a screen that is displayed during a screen scroll of a web browser according to an embodiment of the present invention.

Referring to FIG. 16, the display unit 110 displays a part 1610 of web page. The controller 170 recognizes a drag 1621 of a finger 1620 by analyzing detection information received from the touch panel 110. The controller 170 recognizes that the function set for the finger drag is a "screen scroll" by identifying the input setting information stored in the memory 160. Thus, the controller 170 controls the display unit 110 to display another part of web page.

Figure 17:
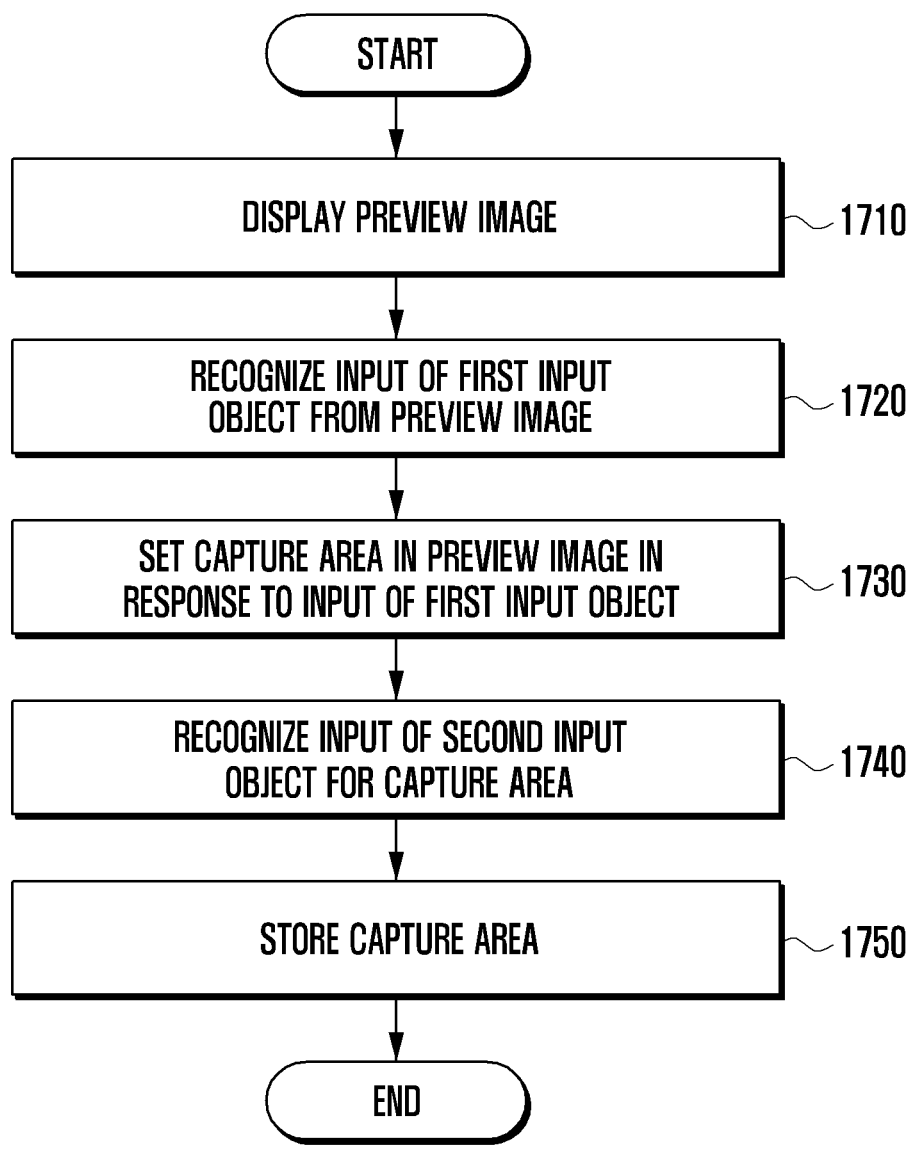
FIG. 17 is a flowchart illustrating a user input process during a camera application according to an embodiment of the present invention.
Figure 18A:
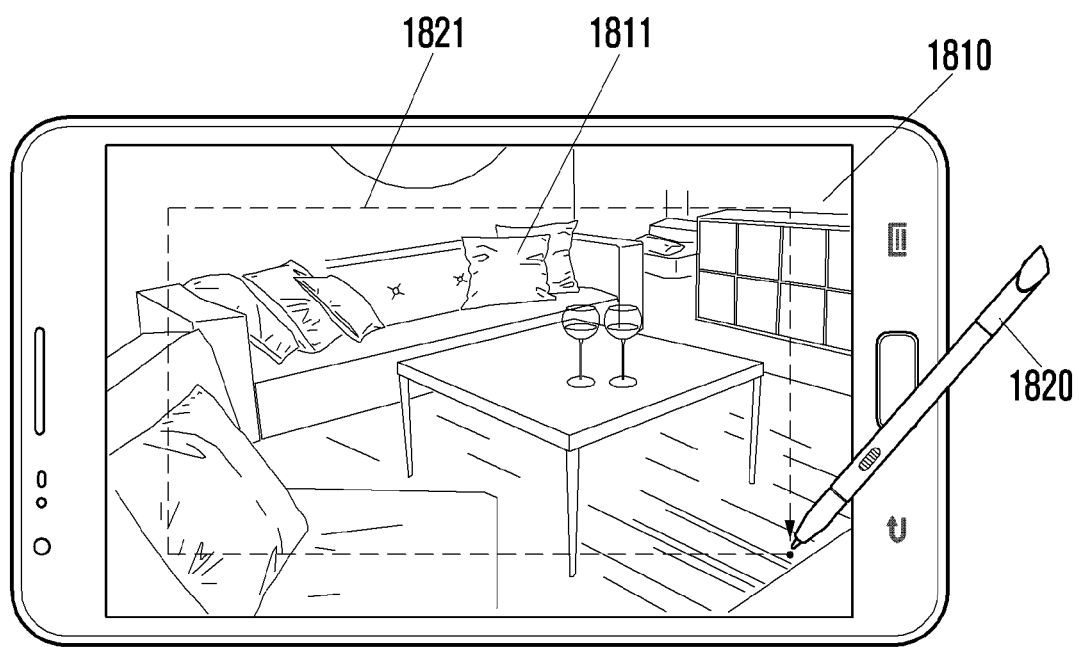
FIGS. 18A and 18B illustrate examples of screens that are displayed during a camera application according to an embodiment of the present invention.
Figure 18B:
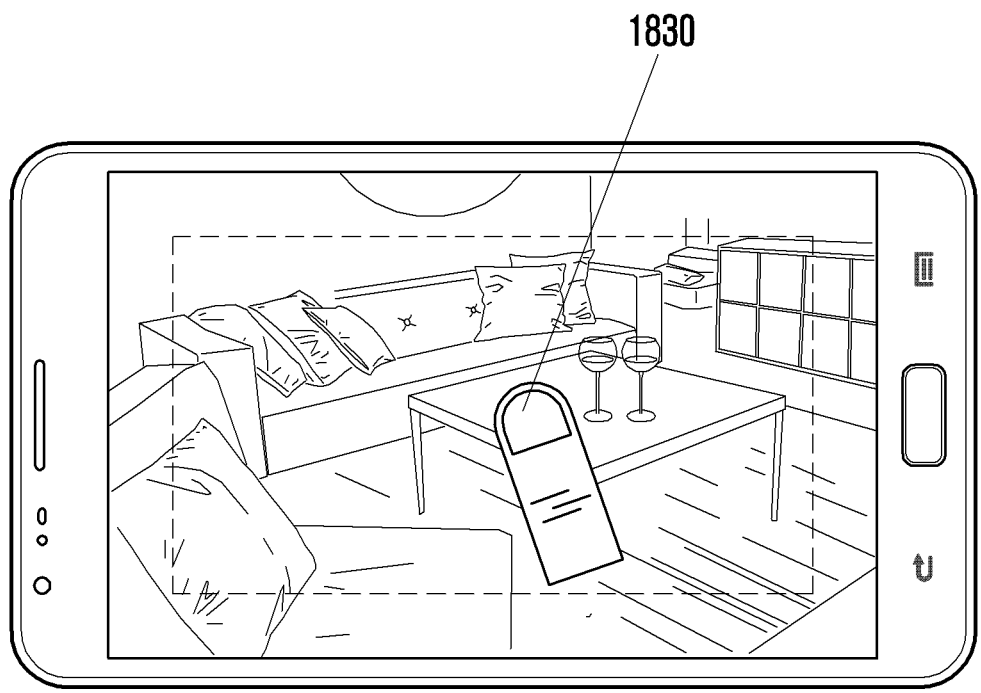

FIG. 17 is a flowchart illustrating a user input process during a camera application according to an embodiment of the present invention. FIGS. 18A and 18B illustrate examples of screens that are displayed during a camera application according to an embodiment of the present invention.

Referring to FIG. 17, in step 1710, the controller 170 receives a preview image from the camera 150, and controls the display unit 110 to display a received preview image (1810; see FIG. 18A).

In step 1720, the controller 170 analyzes detection information received from the touch panel 111, and recognizes an input of a first input object, e.g., a pen (1820; see FIG. 18A) from the preview image.

In step 1730, the controller 170 sets a capture area 1811 in the preview image 1810 in response to the input of the first input object. For example, if an input pattern of the pen 1820 is a closed curve 1821, a part of the preview image located inside of the closed curve 1821 may be set to the capture area 1811.

In step 1740, the controller 170 analyzes the detection information received from the touch panel 111, and recognizes an input (e.g., tab) of a second input object, e.g., a finger (1830; see FIG. 18B) for the capture area 1811.

In step 1750, the controller 170 stores image information corresponding to the capture area 1811 in the memory 160 in response to the input of the second input object. Specifically, the controller 170 extracts a part corresponding to the capture area 1811 from the raw data received from an ISP of the camera 150, and compresses the extracted part in a JPEG format or the like, to store in the memory 160.

Figure 19:
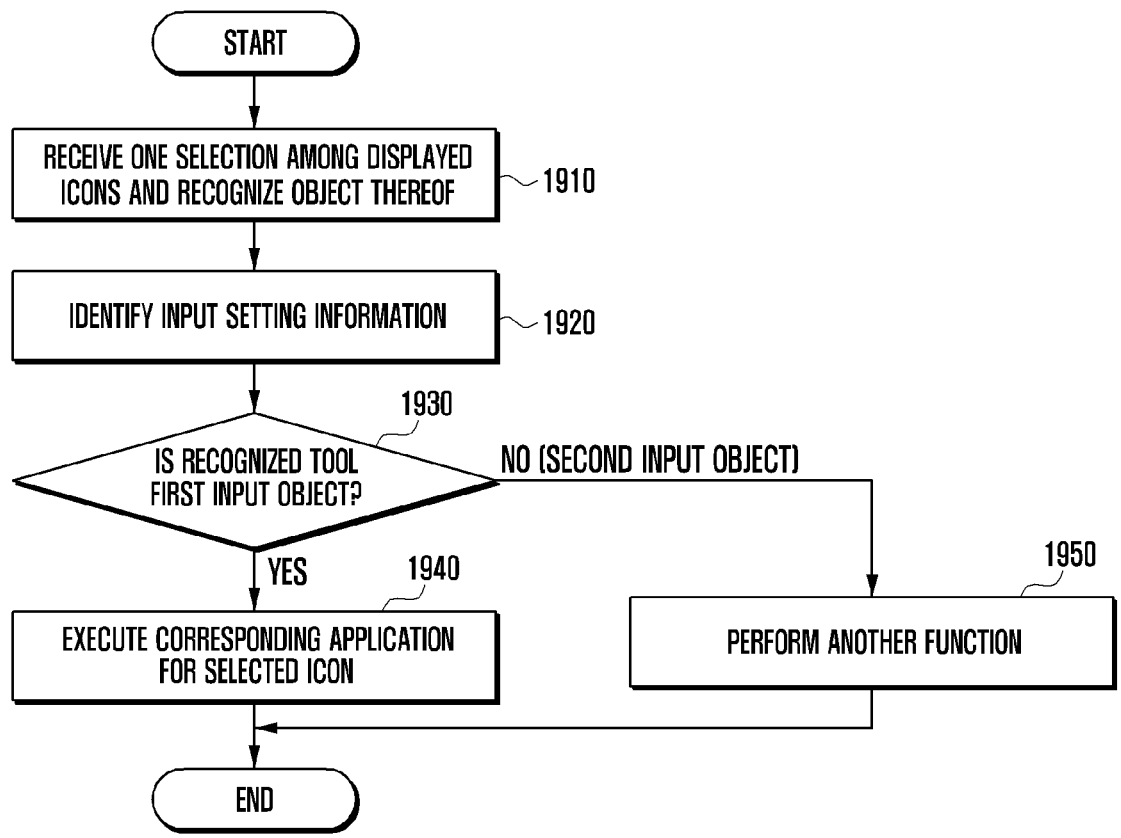
FIG. 19 is a flowchart illustrating a user input process to an icon according to an embodiment of the present invention.

FIG. 19 is a flowchart illustrating a user input process to an icon according to an embodiment of the present invention.

Referring to FIG. 19, in step 1910, the controller 170 receives a selection of an icon displayed on the screen (e.g., a home screen, a lock screen, an application execution screen, etc.) from the touch panel 111, and recognizes the input object that performed the selection.

In step 1920, the controller 170 identifies input setting information by accessing the memory 160.

In step 1930, the controller 170 determines whether the recognized tool is the first input object (e.g., a finger) for executing an application with reference to the identified input setting information.

If the recognized tool is the first input object, the controller 170 executes a corresponding application for the selected icon in step 1940.

If the recognized tool is not the first input object, but the second input object (e.g., a pen), the controller 170 performs another function (e.g., setting menu display) in step 1950.

The foregoing embodiments of the present invention may be implemented in a program command form executable by various computer means and be recorded in a computer readable recording medium. In this case, the computer readable recording medium may include a program command, a data file, and a data structure individually or a combination thereof. The program command recorded in a recording medium may be specially designed or configured for the present invention or be known to a person having ordinary skill in a computer software field to be used. The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, or flash memory for storing and executing program commands. Further, the program command includes a machine language code created by a compiler and a high-level language code executable by a computer using an interpreter.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for operating an electronic device including a touch screen, the method comprising:
    displaying, on the touch screen, one or more graphic user interface (GUI) items included in a setting menu of an application;
    receiving a first touch input in respect to a first GUI of the one or more GUI items by sensing a first external input object at a first area at which the first GUI is displayed on the touch screen;
    receiving a second touch input in respect to a second GUI of the one or more GUI items by sensing a second external input object at a second area at which the second GUI is displayed on the touch screen, wherein the second external input object is different from the first external input object;
    storing first information on the first external input object and a first drawing attribute, corresponding to the first GUI, associated with the first external input object according to receiving the first touch input;
    storing second information on the second external input object associated with a second drawing attribute corresponding to the second GUI according to receiving the second touch input;
    receiving a touch input on the touch screen;
    determining whether the received touch input is input using the first external input object or the second external input object;
    identifying drawing attribute for the touch input from the stored information based on the determination; and
    applying the identified drawing attribute to the touch input.

2. The method of claim 1, wherein the setting menu includes an item corresponding to at least one of a line drawing function, a marker drawing function, an erase function, a highlight function, and a figure drawing function.

3. The method of claim 1, further comprising:
    displaying a sub setting menu related with the first GUI or the second GUI; and
    receiving a selection for an attribute in the sub setting menu,
    wherein applying the identified drawing attribute comprises executing a function corresponding to the selected attribute in the sub setting menu.

4. The method of claim 3, wherein the sub setting menu comprises information related to at least one of thickness, color, and transparency.

5. The method of claim 3, wherein the function includes one of a line drawing function, a marker drawing function, an erase function, a highlight function, and a figure drawing function.

6. An electronic device, comprising:
    a touch screen;
    a memory; and
    a processor electronically connected to the touch screen and the memory, and configured to:
        display one or more graphic user interface (GUI) items included in a setting menu of an application on the touch screen,
        receive a first touch input in respect to a first GUI of the one or more GUI items by sensing a first external input object at a first area at which the first GUI is displayed on the touch screen,
        receive a second touch input in respect to a second GUI of the one or more GUI items by sensing a second external input object at a second area at which the second GUI is displayed on the touch screen, wherein the second external input object is different from the first external input object,
        store, in the memory, first information on the first external input object and a first drawing attribute, corresponding to the first GUI, associated with the first external input object according to receiving the first touch input,
        store, in the memory, second information on the second external input object associated with a second drawing attribute corresponding to the second GUI according to receiving the second touch input,
        receive a touch input on the touch screen,
        determine whether the received touch input is input using the first external input object or the second external input object,
        identifying a drawing attribute for the touch input from the stored information based on the determination, and
        apply the identified drawing attribute to the touch input.

7. The electronic device of claim 6, wherein the setting menu comprises an item corresponding to at least one of a line drawing function, a marker drawing function, an erase function, a highlight function, and a figure drawing function.

8. The electronic device of claim 6, wherein the processor displays a sub setting menu related to the first GUI or the second GUI, receives a selection for an attribute in the sub setting menu from the touch panel, and executes a function corresponding to the selected attribute in the sub setting menu.

9. The electronic device of claim 8, wherein the sub setting menu comprises information related to at least one of thickness, color, and transparency.

10. The electronic device of claim 8, wherein the function is one of a line drawing function, a marker drawing function, an erase function, a highlight function, and a figure drawing function.

* * * * *